(12) United States Patent
Yang et al.

(10) Patent No.: US 11,625,339 B1
(45) Date of Patent: Apr. 11, 2023

(54) LARGE SCALE RESPONSIVE AND GENERIC ENDPOINT COMMAND INVOCATION MECHANISM

(71) Applicant: Rapid7, Inc., Boston, MA (US)

(72) Inventors: Xi Yang, East York (CA);
Paul-Andrew Joseph Miseiko, Mississauga (CA); Ryan Tonini, Vaughan (CA); Bingbin Li, North York (CA)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/581,682

(22) Filed: Jan. 21, 2022

(51) Int. Cl.
  *G06F 13/10* (2006.01)
  *G06F 13/18* (2006.01)

(52) U.S. Cl.
  CPC ............ *G06F 13/102* (2013.01); *G06F 13/18* (2013.01)

(58) Field of Classification Search
  None
  See application file for complete search history.

(56) References Cited

U.S. PATENT DOCUMENTS

| | | | |
|---|---|---|---|
| 7,698,359 B2 | 4/2010 | Wray et al. | |
| 8,893,212 B2 | 11/2014 | Reisman | |
| 9,467,876 B2 | 10/2016 | Kummetz et al. | |
| 9,649,999 B1 | 5/2017 | Amireddy et al. | |
| 9,794,292 B2 | 10/2017 | Hussain et al. | |
| 10,777,216 B2 | 9/2020 | Bar-Or et al. | |
| 10,791,169 B2 | 9/2020 | Cencini et al. | |
| 2013/0007207 A1* | 1/2013 | Dietrich | G06F 16/183 709/217 |
| 2020/0218580 A1 | 7/2020 | Kim | |
| 2020/0412567 A1 | 12/2020 | Ansari et al. | |

* cited by examiner

*Primary Examiner* — Scott C Sun
(74) *Attorney, Agent, or Firm* — Ashwin Anand; Lei Sun

(57) ABSTRACT

Systems and methods are disclosed to implement an endpoint command invocation system ("ECIS"). In some embodiments, ECIS can quickly dispatch a command to a large number of endpoint components, where the endpoint components are online. ECIS can receive an invocation of a command, which can include the command recipients. In some embodiments, ECIS determines that some of the command recipients are online, while some of the command recipients are offline. ECIS determines connections to the online command recipients based on a connection map, which is updated whenever an endpoint component opens a connection to ask for a command. ECIS can deliver the command to the online command recipients using the connections. ECIS can also deliver the command to dispatch queues corresponding to the offline command recipients, where the dispatch queues store the command as a pending command that can be delivered to their respective command recipients whenever they come online.

20 Claims, 13 Drawing Sheets

An invocation manager receives an invocation of a command from a client, which includes command recipients.
1010

The invocation manager stores information regarding the command to a data store.
1020

The invocation manager uses a global connection map to determine invocation worker(s) that have at least one connection to at least one of the command recipients.
1030

Dispatch the command to the determined invocation worker(s).
1040

FIG. 10

US 11,625,339 B1

LARGE SCALE RESPONSIVE AND GENERIC ENDPOINT COMMAND INVOCATION MECHANISM

BACKGROUND

Many organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

Modern network systems offer the ability to monitor network traffic in client networks, and to collect data to power services such as enterprise security management system that analyzes data for signs of unauthorized intrusion or other types of malicious activity. In some such systems, network sensors are deployed inside the client network to collect network traffic metadata and upload the metadata to a centralized network monitoring platform. As more and more on-premises components are deployed into customer environments, in order to collect data to power products on the platform side, there is a need for a command and control mechanism to allow for on-demand customized data collection on individual assets. However, command and control mechanisms are lacking in that they do not solve problems of speed and scale.

SUMMARY OF EMBODIMENTS

The systems and methods described herein may be employed in various combinations and in embodiments to implement an endpoint command invocation system ("ECIS") that sends commands to multiple command recipients in parallel using established connections to the command recipients identified from a connection map. In some embodiments, ECIS can quickly dispatch a command to a large number of endpoint components, where the endpoint components are online. ECIS can receive an invocation of a command, which can include the command recipients. In some embodiments, ECIS determines that some of the command recipients are online, while some of the command recipients are offline. ECIS determines connections to the online command recipients based on a connection map, which is updated whenever an endpoint component opens a connection to ask for a command. ECIS can deliver the command to the online command recipients using the connections. ECIS can also deliver the command to dispatch queues corresponding to the offline command recipients, where the dispatch queues store the command as a pending command that can be delivered to their respective command recipients whenever they come online.

BRIEF DESCRIPTION OF THE DRAWINGS

FIG. 10 is a flowchart illustrating a process of an invocation manager receiving an invocation of a command from a client and dispatching the command to determined invocation worker(s), according to some embodiments.

Figure 1:
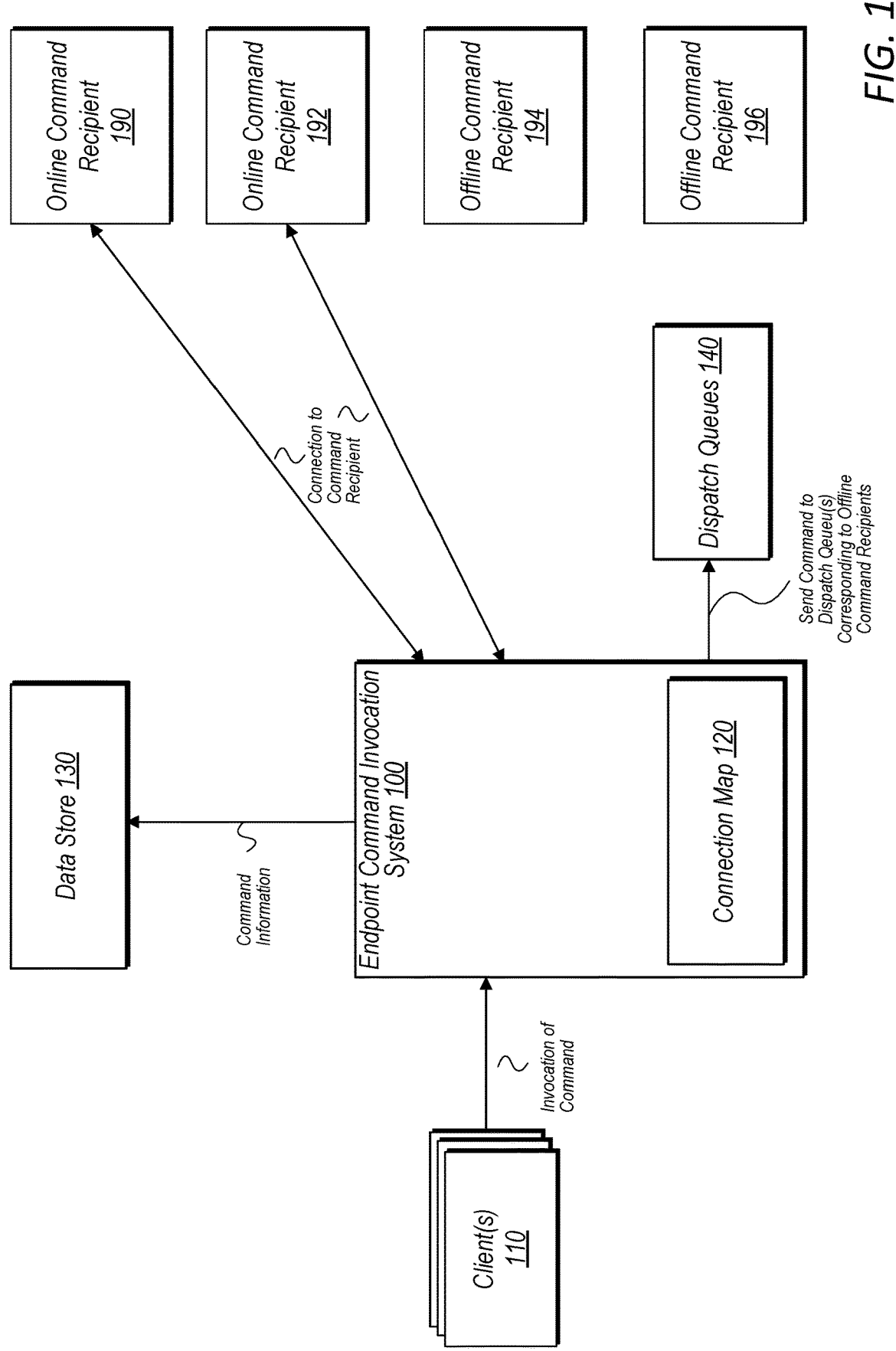
FIG. 1 is a block diagram illustrating an example endpoint command invocation system that receives an invocation of a command from a client, and sends the command to online command recipients using established connections while storing the command to a dispatch queue for offline command recipients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Embodiments of the large scale responsive and generic endpoint command invocation system ("ECIS") allows for responsive command delivery to various different types of command recipients that can readily scale to the appropriate number of command recipients, potentially tens of millions of recipients, or even more. Embodiments of the ECIS delivers commands to endpoint components. Embodiments of the ECIS do not care about the actual content of the commands, but instead manages the delivery of the commands, as long as both the sender and receiver conform to certain rules.

Embodiments of the ECIS are generic, in that the ECIS not bound to any specific component. Instead, these embodiments focus on invocation and command dispatch, but are not interested in the contents of the package, and are therefore able to serve all endpoint components. In addition, embodiments of the ECIS provide speed in dispatching the commands, with some embodiments almost instantly dispatching commands to the endpoint component if the asset is online. In some operations that are speed critical, such as with managed detection and response ("MDR") or incident response ("IR") to catch a breach, this makes all the difference for the customer. Embodiments of the ECIS also scale, in that millions of clients can be supported at the same time with much lower cost compared to existing solutions.

In a workflow according to some embodiments, the sender creates the command or package, gives it to the system, and gets back a reference ID or tracking ID. In other embodiments, the sender creates an invocation ID, and provides it together with the command when the sender calls the invocation API on the ECIS. This invocation ID can be used as the tracking ID, in some of these embodiments. The sender can then use this reference ID or tracking ID to check with the system on the status of the delivery of the command, where it is at, and any exception that happened in the delivery of the command. Once the endpoint component receives the command, it performs necessary actions, and is also responsible to update the status of the command to the completed or error terminal states. If the endpoint component does not come online to receive the package in a specified validity period, the command is expired, which is another terminal state.

The ECIS may provide remote management and/or automation of command execution on compute instances or other computing resources in a centralized and/or structured manner. In one embodiment, the ECIS may implement aspects of a Run Command. Using the ECIS, a client may remotely and securely manage "on premises" computing resources, such as resources running in the client's data center, "cloud" computing resources (e.g., virtual compute instances) running on a cloud-based computing platform, or computing resources both on premises and in the cloud. Through a unified interface, the ECIS may be used to manage a diverse range of computing resources, including virtual compute instances and/or physical compute instances on a variety of platforms. The ECIS may provide a simple way of automating common administrative commands such as executing shell scripts on instances with a Linux operating system, running PowerShell commands on instances with a Windows operating system, installing software or patches, and so on. The ECIS may allow a client to execute such commands across multiple instances while also providing visibility into the results and enabling management of configuration change across fleets of instances. The ECIS may offer various features for ease of instance management. In one embodiment, the ECIS may include access control through integration to apply granular permissions to control the actions that users can perform against instances. In one embodiment, actions taken with the ECIS may be recordable to enable clients to review and audit changes throughout their compute environments.

The ECIS may include a client interface permitting interaction between the ECIS and one or more clients. Using the client interface, the ECIS may receive various types of data, metadata, and instructions from clients, such as configuration requests, invocations of service functionality, and command execution documents (or selections thereof) to be executed on instances. The client interface may receive command execution documents from a client. In one embodiment, the command execution documents may be referenced or specified by the clients in a user interface presented by the ECIS, and loaded from any suitable location, potentially including locally accessible storage of the ECIS itself. The command execution documents may be specified or received by the ECIS through any appropriate client interface, potentially including an application programming interface (API) or other programmatic interface, a command-line interface (CLI), a graphical user interface (GUI), and/or suitable forms of interfaces. Using the client interface, the ECIS may send various types of data and metadata to clients, such as results of configuration requests, acknowledgements of invocations of service functionality, and results and status updates associated with command execution documents. The client interface may optionally send such command execution responses to a client, and command execution responses from the client. The command execution responses may be marshaled by the ECIS from the execution of command execution documents on one or more computing resources associated with the client, e.g., one or more of a set of compute instances. The client interface may be part of a proprietary messaging infrastructure.

The ECIS may also include a command recipient interface permitting interaction between the ECIS and one or more command recipients, such as compute instances or other computing resources. The command recipient interface may interact with agent software resident on the compute instances and associated with the ECIS. A compute instance may execute agent software. Various copies of the agent software may differ in their underlying program instructions if the compute instances have different platforms (e.g., different operating systems and/or computing hardware), but the agent software may generally provide the same functionality across the various instances. Although instances (and their corresponding components) are shown for purposes of illustration and example, it is contemplated that any suitable number and configuration of instances may be used with the ECIS. The command execution documents may be sent by the ECIS to the instances through any appropriate command recipient interface, e.g., an application programming interface (API) or other programmatic interface and/or protocol(s) suitable for transmitting requests and data over a network. On the respective instances, the agents may initiate and oversee command execution based (at least in part) on command execution documents provided by the ECIS. For example, an instance may include command execution documents as managed by an agent. In one embodiment, the agent software may be installed on a compute instance when the instance is provisioned from a provider network, e.g., from a machine image that also includes operating system software. In one embodiment, the agent software may be installed with approval from the client that controls the instance, e.g., if the client seeks to use the command execution service. The command recipient interface may be part of a proprietary messaging infrastructure.

Command execution documents may also be referred to as command definitions or command data structures. Command execution documents may use any suitable format(s) and/or data structure(s) to reference, describe, or otherwise indicate one or more commands to be performed by computing resources. The commands within a command execution document may include entirely different commands (e.g., commands having different program code) and/or commands that run the same program code for different input data. For a particular command, a command execution document may include or reference program instructions to be executed in processing the command. The program instructions may also be referred to as a plug-in. A command execution document may include or reference a set of input data and/or arguments to be processed using the program instructions, potentially using multiple copies of an application or set of program code to process different elements of the input data sequentially or concurrently. For example, a particular command execution document may represent a software installation command, and the document may reference a named plug-in suitable for software installation (potentially a globally available plug-in for multiple clients of the provider network), user-specified parameters (e.g., specifying the location of the installer), arguments for the installer, and so on. In one embodiment, a command execution document may also include or be provided with other suitable metadata, including timing information (e.g., a time to begin processing the workload, an anticipated time to run the workload, and/or a deadline), budgetary information, anticipated resource usage, and so on. For example, the anticipated resource usage associated with a command execution document may indicate one or more values (including a range of values) for anticipated processor usage (e.g., a number of virtual CPUs), memory usage, storage usage, network usage, and/or other hardware resource characteristics.

The agent software, which can be referred to as an on-premises component in some embodiments, may comprise program instructions that are executable to interact with the ECIS to implement execution of commands on the instance. For example, the agent software may be executable to receive, from the ECIS over a network connection, a command execution document that references or describes one or more commands to be executed on the instance. The agent software may be further executable to initiate and oversee the execution of the one or more commands specified in the document. In doing so, the agent software may retrieve any program code (also referred to herein as a plug-in) referenced or specified in the document, initiate the execution of that program code with any input data or arguments referenced or specified in the document, and report any results and/or status updates (e.g., success or failure of the command execution) to an appropriate recipient, such as the ECIS. The program code associated with the command execution document may be resident on the instance from startup, may be cached on the instance temporarily (e.g., based on a prior execution), or may be retrieved from an external source over a network. In some embodiments, different compute instances configured with the agent software may be used in parallel by the same client, potentially to execute the same type of command (often with different input) simultaneously. In one embodiment, the agent software may be configured to ask for command execution documents from the ECIS, e.g., on a periodic basis. For example, the ECIS may place command execution documents in one or more dispatch queues (e.g., with one queue per instance), and one or more documents in the dispatch queue may be provided to the corresponding agent upon the service receiving a request from that agent.

In order to further solve problems of speed and scale, some embodiments of the ECIS provide two types of services in the system: (1) the invocation manager and (2) the invocation worker. An Invocation manager serves the sender of commands, where as the invocation worker delivers the commands to components. In some embodiments the invocation manager and the invocation worker operate in the following manner for invoking a command to an on-premises component. First, the sender creates a command object, and invokes the command through the system's invocation manager API. An invocation manager can then write invocation and command details to a database, and set the command status as "created." The invocation manager can check a connection map, to find which invocation worker instance has the connection to the component. If a connection doesn't exist, the invocation manger can put the command on to the dispatch queue for the given component. If a connection does exist, the invocation manager can bypass any load balancer and call the internal invoke API directly on the invocation worker to dispatch the command. The invocation worker's internal controller can find the held connection in connection map and deliver the command to the on-prem component. The invocation worker can update the status of the command in the database to "dispatched." If any error or connection is no longer valid, the invocation worker can put the command on to the dispatch queue for the given component.

In some embodiments the invocation manager and the invocation worker operate in the following manner when a command recipient, such as an on-premises component, provides an indication that it is able to receive a command. First, a command recipient component can request a command, such as by calling a "getCommand" API on an invocation worker, and/or such as by using a long poll request. A long poll request can be, in some embodiments, where a client polls a server requesting new information, and the server holds the request open until new data is available. Once new data is available, in these embodiments, the server responds and sends the new information to the client. When the client receives this information, in these embodiments, it then sends another request, and the operation is repeated. When an invocation worker receives a request for a command from a command recipient, the invocation worker can check if there are pending commands on a dispatch queue for the given command recipient. If there are pending commands on the dispatch queue, then the invocation worker can return the pending commands to the command recipient component and update a database to "dispatched." The invocation worker can create and/or update its internal ConnectionMap to include the command recipient upon receiving the request, such as the long poll request. This internal ConnectionMap can allow the invocation worker to find the connection to the command recipient quickly, when there is a command to be delivered. The invocation worker can also create and/or update the shared ConnectionMap to include the command recipient upon receiving the request, such as the long poll request. This shared Connection Map can allow the invocation manger to find the invocation worker that holds the connection to the command recipient quickly, when there is a command to be delivered.

In some embodiments, the ECIS can be part of a machine assessment service. In some embodiments, the machine assessment system may be implemented as a cloud-based or network-accessible service, which is configured to interact with ECIS to receive machine characteristics data from a large number of different client machines and perform security vulnerability assessments on remote machines based on the received data. In some embodiments, the machine assessment service is configured to interact with the ECIS to provide commands to a large number of client machines to perform a variety of security vulnerability assessments of the client machines based on machine characteristics data collected by commands executed by the respective agents on the machines. Moreover, the machine assessment service may interact with the ECIS to implement multiple independent delta collection processes to collect different categories of machine characteristics data. For example, different delta collection processes may be implemented to collect configuration data of different applications installed on the client machine. Each of delta collection process may be used to maintain a different snapshot of the machine characteristics data of that category. The different snapshots may be combined to create an up-to-date virtual representation of the client machine.

In some embodiments, the ECIS may implement a validation mechanism to validate the command after it has been sent. The validation may be implemented by comparing two check values: a check value computed from the current command at the client machine, and another check value computed from the command at the ECIS. The check value may be computed as a checksum, a hash value, or some other type of value.

As will be appreciated by those skilled in the art, the disclosed features of the ECIS provide numerous technical improvements to enhance the functioning of existing command and control systems in the state of the art. These and other features and benefits of the disclosed ECIS are described in further detail below, in connection with the figures.

Embodiments of the Endpoint Command Invocation System

FIG. 1 is a block diagram illustrating an example endpoint command invocation system 100 that receives an invocation of a command from a client 110, and sends the command to online command recipients (190, 192) using established connections while storing the command to a dispatch queue 130 for offline command recipients (194, 196), according to some embodiments. In some embodiments, the depicted operations on the command recipients (190, 192, 194, 196) may be performed by an agent executing on the command recipients, which is configured to communicate with the ECIS 100 over one or more networks, to receive commands from the ECIS. In some embodiments, the ECIS 100 may be implemented as a cloud-based or network-accessible service, which is configured to provide responsive command delivery to various different types of command recipients that can readily scale to the appropriate number of command recipients. In some embodiments, each agent on the client machines may be assigned a unique agent ID that identifies the agent to the ECIS.

The ECIS 100 can receive an invocation of a command from one or more clients 110. The invocation can not only include a command but also a plurality of command recipients (such as 190, 192, 194, 196). The ECIS can store information regarding the command to a data store 130. The ECIS can determine that a first command recipient (190) of the plurality of command recipients is online. Responsive to this determination that the first command recipient (190) is online, the ECIS can identify an established connection to the first command recipient (190) according to a description of the established connection stored in a connection map (120). The ECIS can send the command to the first command recipient (190) using the established connection to the first command recipient identified from the connection map (120). The ECIS can also determine that a second command recipient (194) of the plurality of command recipients is offline. Responsive to this determination that the second command recipient is offline, the ECIS can store the command to a dispatch queue (140) for the second command recipient (194), to be provided to the second command recipient responsive to a request from the second command recipient.

Depending on the embodiment, the data store 130 and/or the connection map 120 may be stored using a variety of storage systems, such as a structured database (e.g. a SQL database), a key-value data store, a file system, or another type of storage system. In some embodiments, the connection map 120 may be generated in a different format from the data store 130. For example, the data store 130 may be stored natively in a binary encoding format, and the connection map 120 may be generated in a text encoding format that encodes individual text characters in a defined character set. Examples of character encoding formats include ASCII, various types of Unicode encoding formats such as UTF-8, UTF-16, UTF-32, and the like. A binary encoding format, on the other hand, does not encode data to represent individual characters in a defined character set.

The ECIS 100 may provide remote management and/or automation of command execution on compute instances or other computing resources (such as 190, 192, 194, 196) in a centralized and/or structured manner. In one embodiment, the ECIS 100 may implement aspects of a Run Command. Using the ECIS 100, a client may remotely and securely manage "on premises" computing resources (190, 192, 194, 196), such as resources running in the client's data center, "cloud" computing resources (e.g., virtual compute instances) running on a cloud-based computing platform, or computing resources both on premises and in the cloud. Through a unified interface, the ECIS 100 may be used to convey commands to a diverse range of computing resources, including virtual compute instances and/or physical compute instances on a variety of platforms. The ECIS 100 may provide a simple way of automating common administrative commands such as executing shell scripts on instances with a Linux operating system, running PowerShell commands on instances with a Windows operating system, installing software or patches, and so on. The ECIS 100 may allow a client to execute such commands across multiple instances while also providing visibility into the results and enabling management of configuration change across fleets of instances. The ECIS 100 may offer various features for ease of instance management. In one embodiment, the ECIS 100 may include access control through integration to apply granular permissions to control the actions that users can perform against instances. In one embodiment, actions taken with the ECIS 100 may be recordable to enable clients to review and audit changes throughout their compute environments.

The ECIS 100 may include a client interface permitting interaction between the ECIS 100 and one or more clients 110. Using the client interface, the ECIS 100 may receive various types of data, metadata, and instructions from clients, such as configuration requests, invocations of service functionality, and command execution documents (or selections thereof) to be executed on instances. The client interface may receive command execution documents from a client 110. In one embodiment, the command execution documents may be referenced or specified by the clients in a user interface presented by the ECIS 100, and loaded from any suitable location, potentially including locally accessible storage of the ECIS 100 itself. The command execution documents may be specified or received by the ECIS 100 through any appropriate client interface, potentially including an application programming interface (API) or other programmatic interface, a command-line interface (CLI), a graphical user interface (GUI), and/or suitable forms of interfaces. Using the client interface, the ECIS 100 may send various types of data and metadata to clients 110, such as results of configuration requests, acknowledgements of invocations of service functionality, and results and status updates associated with command execution documents. The client interface may optionally send such command execution responses to a client 110, and command execution responses from the client 110. The command execution responses may be marshaled by the ECIS 100 from the execution of command execution documents on one or more command recipients (190, 192, 194, 196) associated with the client, e.g., one or more of a set of computing resources or compute instances. The client interface may be part of a proprietary messaging infrastructure.

The ECIS 100 may also include a command recipient interface permitting interaction between the ECIS 100 and one or more command recipients (190, 192, 194, 196), such as compute instances or other computing resources. The command recipient interface may interact with agent software resident on the compute instances and associated with the ECIS 100. A compute instance (190, 192, 194, 196) may execute agent software. Various copies of the agent software may differ in their underlying program instructions if the compute instances have different platforms (e.g., different operating systems and/or computing hardware), but the agent software may generally provide the same functionality across the various instances. Although instances (and their corresponding components) are shown for purposes of illustration and example, it is contemplated that any suitable number and configuration of instances may be used with the ECIS 100. The command execution documents may be sent by the ECIS 100 to the command recipients (190, 192, 194, 196) through any appropriate command recipient interface, e.g., an application programming interface (API) or other programmatic interface and/or protocol(s) suitable for transmitting requests and data over a network. On the respective command recipients (190, 192, 194, 196), the agents may initiate and oversee command execution based (at least in part) on command execution documents provided by the ECIS 100. For example, a command recipient instance may include command execution documents as managed by an agent. In one embodiment, the agent software may be installed on a compute instance when the instance is provisioned from a provider network, e.g., from a machine image that also includes operating system software. In one embodiment, the agent software may be installed with approval from the client that controls the instance, e.g., if the client seeks to use the command execution service. The command recipient interface may be part of a proprietary messaging infrastructure.

Command execution documents may also be referred to as command definitions or command data structures. Command execution documents may use any suitable format(s) and/or data structure(s) to reference, describe, or otherwise indicate one or more commands to be performed by the command recipients (190, 192, 194, 196). The commands within a command execution document may include entirely different commands (e.g., commands having different program code) and/or commands that run the same program code for different input data. For a particular command, a command execution document may include or reference program instructions to be executed in processing the command. The program instructions may also be referred to as a plug-in. A command execution document may include or reference a set of input data and/or arguments to be processed using the program instructions, potentially using multiple copies of an application or set of program code to process different elements of the input data sequentially or concurrently. For example, a particular command execution document may represent a software installation command, and the document may reference a named plug-in suitable for software installation (potentially a globally available plug-in for multiple clients of the provider network), user-specified parameters (e.g., specifying the location of the installer), arguments for the installer, and so on. In one embodiment, a command execution document may also include or be provided with other suitable metadata, including timing information (e.g., a time to begin processing the workload, an anticipated time to run the workload, and/or a deadline), budgetary information, anticipated resource usage, and so on. For example, the anticipated resource usage associated with a command execution document may indicate one or more values (including a range of values) for anticipated processor usage (e.g., a number of virtual CPUs), memory usage, storage usage, network usage, and/or other hardware resource characteristics.

The agent software, which can be referred to as an on-premises component in some embodiments, may comprise program instructions that are executable to interact with the ECIS 100 to implement execution of commands on the command recipient (190, 192, 194, 196). For example, the agent software may be executable to receive, from the ECIS 100 over a network connection, a command execution document that references or describes one or more commands to be executed on the command recipient. The agent software may be further executable to initiate and oversee the execution of the one or more commands specified in the document. In doing so, the agent software may retrieve any program code (also referred to herein as a plug-in) referenced or specified in the document, initiate the execution of that program code with any input data or arguments referenced or specified in the document, and report any results and/or status updates (e.g., success or failure of the command execution) to an appropriate recipient, such as the ECIS 100. The program code associated with the command execution document may be resident on the command recipient (190, 192, 194, 196) from startup, may be cached on the command recipient temporarily (e.g., based on a prior execution), or may be retrieved from an external source over a network. In some embodiments, different compute instances configured with the agent software may be used in parallel by the same client, potentially to execute the same type of command (often with different input) simultaneously. In one embodiment, the agent software may be configured to ask for command execution documents from the ECIS 100, e.g., on a periodic basis. For example, the ECIS 100 may place command execution documents in one or more dispatch queues 130 (e.g., with one queue per instance), and one or more documents in the dispatch queue 130 may be provided to the corresponding agent upon the service receiving a request from that agent.

Depending on the embodiment, the command recipients (190, 192, 194, 196) or the agents installed on the command recipients may include and/or provide to the ECIS various types of information that are used by the ECIS 100 to identify the machine 110. For example, the command recipients (190, 192, 194, 196) and/or the agents installed on the command recipients may include and/or provide information such as the machine's operating system (OS) version, OS patches installed on the machine, installed applications and their version information, patches, settings, and metadata, various files or file contents on the machine, and configuration data such as the machine's registry entries, security settings, logged events, performance data and metrics, etc., among other information. In some embodiments where the machine is a WINDOWS machine, the command recipients (190, 192, 194, 196) may include the WINDOWS registry of that machine. The WINDOWS registry may be stored in a set of binary blobs called hives, which contain metadata about the hardware, software, and user information about the client machine. In some embodiments, the scope of the data regarding the command recipients (190, 192, 194, 196) is controlled by a rule that specifies what machine data to include.

As shown, the command recipients (190, 192, 194, 196) may implement a data upload interface, which contains components to carry out the upload. In some embodiments, the data upload interface 128 may be configured to communicate with a data receive interface of the ECIS 100, for example, via a specialized application programming interface (API), a service interface, or a network communication protocol. In some embodiments, the data receive interface may be implemented as a web service with a RESTful API. In some embodiments, the two interfaces may implement secure communicate channels such as transport layer security (TLS) connections. In some embodiments, the data upload interface may compress the initial upload using one or more data compression techniques, such as gzip or Lempel-Ziv-Welch (LZW). In some embodiments, due to its size, the initial upload may be broken up into smaller portions and uploaded separately by the data upload interface, and in turn, the data receive interface will reassemble the portions to reconstruct the upload.

Figure 2:
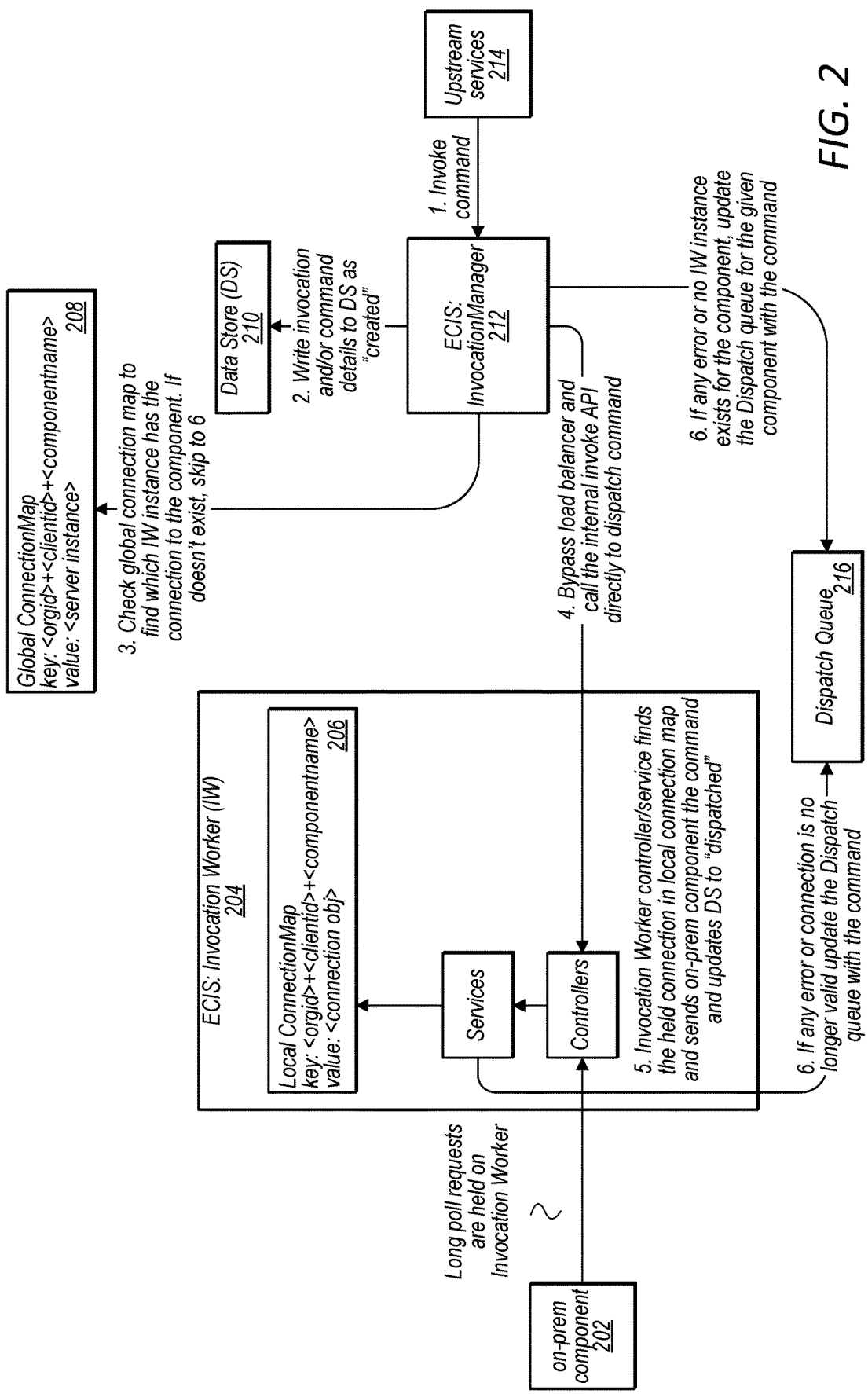
FIG. 2 illustrates an example embodiment of a large scale responsive and generic endpoint command invocation mechanism where an Invocation Manager receives a command invoked by upstream services, dispatches the command to an appropriate invocation worker, and where the invocation worker sends the command to the appropriate on-prem component, according to some embodiments.

FIG. 2 illustrates an example embodiment of a large scale responsive and generic endpoint command invocation mechanism where an Invocation Manager 212 receives a command invoked by upstream services 214, dispatches the command to an appropriate invocation worker 204, and where the invocation worker 204 sends the command to the appropriate on-premises component 202, according to some embodiments. The on-premises component can be a compute server, a compute instance, or agent software as described above, or any other type of computing device or compute instructions executing on a computing device (such as software or an application) that is able to communicate with the invocation worker and execute commands sent by the invocation worker.

The Invocation Manager 212 of ECIS performs the invocation handling, while the Invocation Worker 204 of ECIS performs long poll connection management with the on-premises component, according to some embodiments. The long-poll can have a timeout, in some embodiments, which can be the time-to-live. In some embodiments, this can be 30 seconds. A global connection map 208, which can be implemented as distributed in-memory key—value database, for example, contains various mappings of a client component with the server instance of an invocation worker 204 that handles a connection to that component. The global connection map 208, can use for example the concatenation of the organization identification, along with the client identification, and the name of one of the components to which the command is assigned as a lookup key: <orgId>+<clientId>+<componentname>. This key can be associated with a value which is the server instance that is associated with the invocation worker that maintains a connection with that component: <server instance>. A local connection map 206 can contain a mapping to connection objects, in some embodiments. The connection objects can identify the connection to a specific on-premises component, in some of these embodiments. The local connection map 206 can also be a key-value data store might use the same key as the global connection database to identify the appropriate connection object: <orgId>+<clientId>+<componentname>, in some embodiments. In other embodiments, the local connection map 206 might use a different key, or might not use a key at all.

At step 1 of FIG. 2 a command is invoked by upstream services 214 to the invocation manager ("IM") 212 of the ECIS. At step 2 of FIG. 2, the IM writes the command invocation details and/or the command details to a data store 210. The command invocation details and/or the command details can comprise a status of the command, where the status of the command is set to one of multiple status values, where the values comprise at least a created status and a dispatched status. When the command is first written to the data store 210 at step 2, its status can be set to the "created" status.

The command can be targeted to one or more than one command recipients, which in some embodiments can be an on-premises component. When a command is invoked, the IM performs actions for individual command recipients. At step 3 in FIG. 2, the IM can check to see if an individual command recipient, which the command is targeted for, is online using its own global connection map. The IM can perform this check, in some embodiments, by determining if there is an Invocation Worker ("IW") instance that has a connection to the command recipient. If such an IW exists, the IM can retrieve the server instance of this IW instance from the global connection map 208. If no IW instance is listed in the global connection map for the individual command recipient, then at step 6, the IM can update the dispatch queue 216 for the given command recipient (such as the given on-premises component) with the command.

If such an IW exists, and the IM 212 has retrieved the server instance of this IW instance from the global connection map 208, then, at step 4 of FIG. 2 the IM can call the appropriate IW instance 204 corresponding the individual command recipient directly, bypassing any load balancer. The IM can call the IW instance, for example, by calling the internal invoke API of the IW directly to dispatch the command, in some embodiments. This invoke API can be part of a dedicated asynchronous API to dispatch a command, in some of these embodiments.

At step 5 of FIG. 2, the IW 204 can look up the connection object for the appropriate command recipient from its internal connection map 206. The IW 204 can revive the connection, in some embodiments. The IW 204 can send the command to the on-premises component. The IW 204 can update the status of the command invocation details and/or the command details associated with the command in the data store 210 to a "dispatched" status. If there is any error, and/or if the on-premises component is offline, and/or the connection is no longer valid, then at step 6, the IW can put the command in dispatch queue 216. Regardless of which, IW 204 will update the data store 210 directly at the end of the operation. If any error in the process, or the on-prem component is not online, IW will update the status of the command invocation details and/or the command details associated with the command in the data store 210 to a "created" status.

Figure 3:
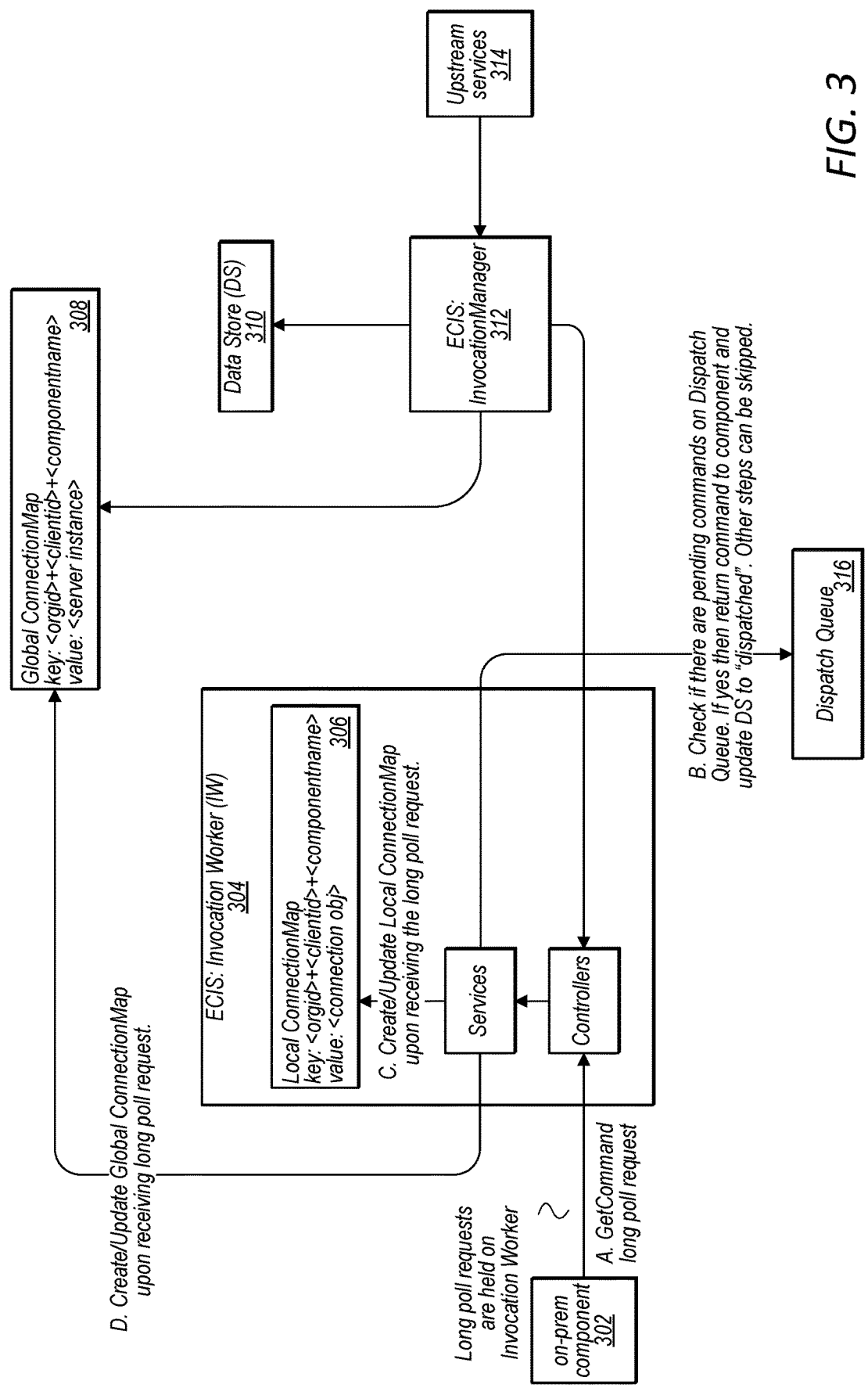
FIG. 3 illustrates the example embodiment of the large scale responsive and generic endpoint command invocation mechanism, detailing a procedure that occurs when an invocation worker receives a request from on on-prem component that was previously not connected, according to some embodiments.

FIG. 3 illustrates the example embodiment of the large scale responsive and generic endpoint command invocation mechanism, detailing a procedure that occurs when an invocation worker 304 receives a request from an on-premises component 302 that was previously not connected, according to some embodiments.

At step A of FIG. 3, a request for a command can be received by the IW 304 from the on-premises component 302. This request for a command can be a "GetCommand" long poll request, in some embodiments. When a new long poll request comes in, IW instance 304 can update both its internal local connection map 306, at step C of FIG. 3, and the global connection map 308, at step D of FIG. 3. At step D, the IW 304 can add an entry to the global connection map 308 linking the componentname of the on-premises component to its own server instance. At step C, the IW can add an entry to its local connection map 306 linking the componentname of the on-premises component to the connection object that connects to that on-premises component. If there is a request timeout or error, then the IW instance 304 can remove the appropriate entry from both maps. In some embodiments, the connection maps (306, 308) should be updated first such that the dispatch queue 316 would only need to be queried once when an on-premises component 302 connects. To achieve this, in these embodiments, the connection maps (306, 308) must be updated first, otherwise a race exists where new commands could be added to the dispatch queue 316 after the dispatch queue 316 was read but before the connection maps (306, 308) were updated. When the long poll connection establishes, the IW 304 can also query the dispatch queue 316 (per step B) to find if there are outstanding commands for this command recipient, in some embodiments. If there are outstanding commands in the dispatch queue 316, then the IW 304 can send those commands to the on-premises component 302. The IW can further update the appropriate entry in the data store 310 to "dispatched." In some embodiments, if the IW instance 304 receives a request for a command from on-premises component 302 and the dispatch queue 316 has outstanding pending commands, then nothing is added/touched/updated on the connection maps (306, 308). Anytime a command recipient sends a request to receive a command, and there are pending commands in dispatch queue 316 for that command recipient, then the connection maps (306, 308) are not used, in these embodiments. If there are no outstanding commands in the dispatch queue 316, then IW 304 can keep the connection open, update the connection maps (306, 308) per steps C & D, and wait for a future command for the on-premises component to be dispatched from the IM 312.

In some embodiments, an ECIS instance can provide for the functionality of both the Invocation Manager (IM) and the Invocation Worker (IW). Which ever instance receives the call of invocation from a client or upstream service can take the role as IM, in these embodiments. In addition, whichever instance(s) that IM calls to serve the commands can take the role of the IW, in these embodiments. In addition, an IM can act as a IW too, if it has to serve clients as well, in some embodiments. In other embodiments, however, specific instances serve as Invocation Managers other specific instances serve as Invocation Workers. In these embodiments, the instances can't switch roles, and are not interchangeable. The functionality and API endpoints are distinct between the one or more TMs and IWs.

Figure 4:
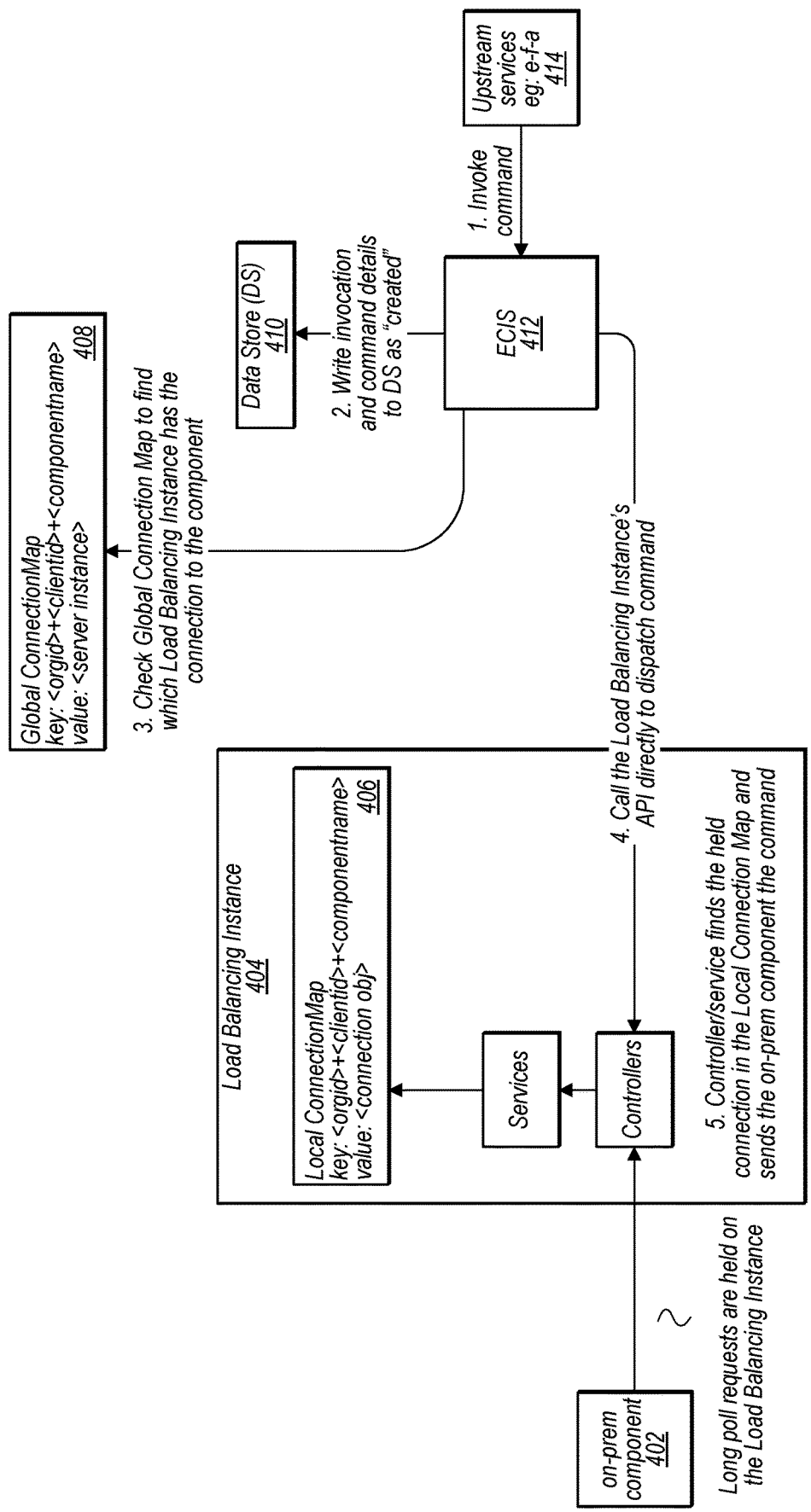
FIG. 4 illustrates a different example embodiment of a large scale responsive and generic endpoint command invocation mechanism ("ECIS") where the ECIS receives a command invoked by upstream services, dispatches the command to load balancing instance, and where the load balancing instance sends the command to the appropriate on-prem component, according to some embodiments.

FIG. 4 illustrates a different example embodiment of a large scale responsive and generic endpoint command invocation mechanism ("ECIS") where the ECIS 412 receives a command invoked by upstream services 414, dispatches the command to a load balancing instance 404, where the load balancing instance sends the command to the appropriate on-premises component 402, according to some embodiments.

In this embodiment, the one ECIS instance 412 performs the invocation handling, and the load balancing instance 404 (which in some embodiments can be implemented by Ensemble-Ingress) performs the long poll connection management, according to some embodiments. The long-poll can have a timeout, in some embodiments, which can be the time-to-live. In some embodiments, this can be 30 seconds. A global connection map 408, which can be implemented as distributed in-memory key—value database, for example, contains various mappings of a client component with the server instance of an load balancing instance 404 that handles a connection to that component. The global connection map 408, can use for example the concatenation of the organization identification, along with the client identification, and the name of one of the components to which the command is assigned as a lookup key: <orgId>+<clientId>+<componentname>. This key can be associated with a value which is the server instance that is associated with the load balancing instance 404 that maintains a connection with that component: <server instance>. A local connection map 406 can contain a mapping to connection objects, in some embodiments. The connection objects can identify the connection to a specific on-premises component, in some of these embodiments. The local connection map 406 can also be a key-value data store that can use the same key as the global connection database 408 to identify the appropriate connection object: <orgId>+<clientId>+<componentname>, in some embodiments. In other embodiments, the local connection map 406 might use a different key, or might not use a key at all.

At step 1 of FIG. 4 a command is invoked by upstream services 414 to the ECIS 412. At step 2 of FIG. 2, the ECIS writes the command invocation details and/or the command details to a data store 410. The command invocation details and/or the command details can comprise a status of the command, where the status of the command is set to one of multiple status values, where the values comprise at least a created status and a dispatched status. When the command is first written to the data store 410 at step 2, its status can be set to the "created" status.

The command can be targeted to one or more than one command recipients, which in some embodiments can be an on-premises component. When a command is invoked, the ECIS performs actions for individual command recipients. At step 3 in FIG. 4, the ECIS 412 can check to see if an individual command recipient, which the command is targeted for, is online using its own global connection map. The ECIS 412 can perform this check, in some embodiments, by determining if there is a load balancing instance 404 that has a connection to the command recipient. If such a load balancing instance exists, the ECIS 412 can retrieve the server instance of this load balancing instance 404 from the global connection map 408.

If ECIS 412 determines that the on-premises component 402 is online, then at step 4 of FIG. 4, ECIS 412 will call that load balancing instance directly, to dispatch the command. The ECIS can call the load balancing instance, for example, by calling the load balancing instance's API directly to dispatch the command, in some embodiments. At step 5 of FIG. 4, the load balancing instance 404 can look up the connection object from its internal local connection map 404, revive the connection, and return the command to the on-prem component. When this is completed, the load balancing component 404 can return the API call to ECIS 412, and ECIS can then update the status of the command in the data store 410 as "dispatched." If any error occurs in the process, or the on-premises component is not online, then ECIS can change the status of the command in the data store 410 to "created."

Figure 5:
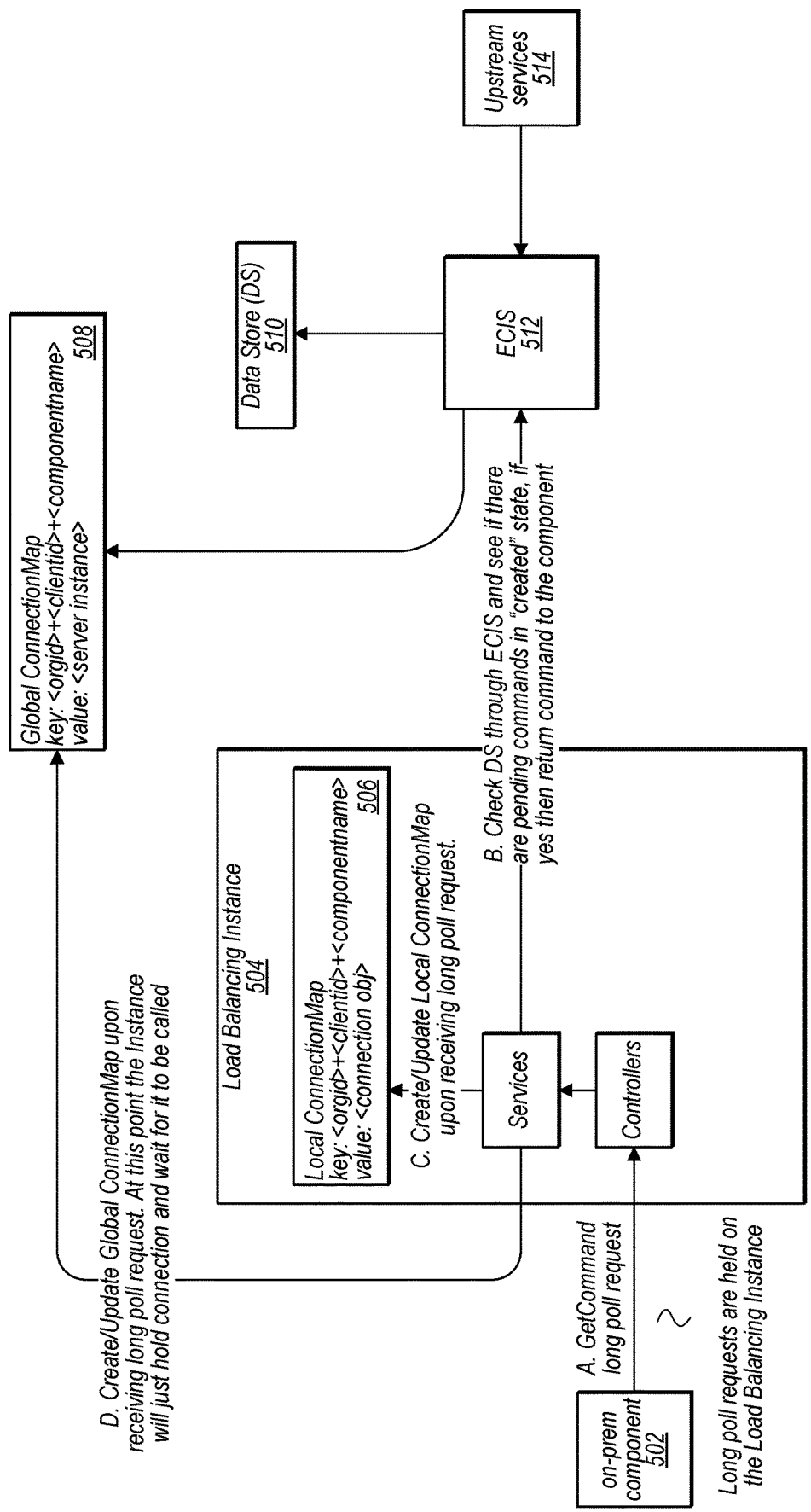
FIG. 5 illustrates the different example embodiment of the large scale responsive and generic endpoint command invocation mechanism that details a procedure that occurs when the load balancing instance receives a request from on on-prem component that was previously not connected, according to some embodiments.

FIG. 5 illustrates the different example embodiment of the large scale responsive and generic endpoint command invocation mechanism that details a procedure that occurs when the load balancing instance 504 receives a request from an on-premises component 502 that was previously not connected, according to some embodiments.

At step A of FIG. 5, a request for a command can be received by the Load Balancing Instance 504 (which can be implemented by an Extensible Ingress instance in some embodiments) from the on-premises component 502. This request for a command can be a "GetCommand" long poll request, in some embodiments. At step B of FIG. 5, when a long poll connection establishes, the load balancing instance 504 can call into ECIS 512 to find if there are outstanding commands on the data store 510 for this on-premises component. If there are no outstanding commands at the data store 510, then the connection can stay open, to wait for a future command for the on-premises component to be dispatched from the ECIS 512. However, if there is outstanding command at the data store 510 for this on-premises component 502, then the oldest command can be retrieved by the load balancing instance 504, and returned to the on-premises component 502 right away. This part is potentially taxing on the data store 510. Therefore, in some embodiments, another table can be created at the data store 510 that counts the number of outstanding commands for a given on-premises component. In some embodiments, if the load balancing instance 504 receives a request for a command from on-premises component 502 and the data store 510 has outstanding pending commands, then nothing is added/touched/updated on the connection maps (506, 508). Anytime a command recipient sends a request to receive a command, and there are pending commands in the data store 510 for that command recipient, then the connection maps (506, 508) are not used, in these embodiments.

When a new long poll request comes in, load balancing instance 504 can update both its internal local connection map 506, at step C of FIG. 5, and the global connection map 508, at step D of FIG. 5, in some embodiments. At step D, the load balancing instance 504 can add an entry to the global connection map 508 linking the componentname of the on-premises component to its own server instance. At step C, the load balancing instance can add an entry to its local connection map 506 linking the componentname of the on-premises component to the connection object that connects to that on-premises component. If there is a request timeout or error, then the load balancing instance 504 can remove the appropriate entry from both maps. In some embodiments, the connection maps (506, 508) should be updated first such that the data store 510 would only need to be queried once when an on-premises component 502 connects. To achieve this, in these embodiments, the connection maps (506, 508) must be updated first, otherwise a race exists where new commands could be added to the data store 510 after the data store 510 was read but before the connection maps (506, 508) were updated. In some embodiments, one database instance (which can be a Redis client instance in some of these embodiments) can handle all the database requests for the global connection map 508, as update connection mapping is the only thing that's needed.

Figure 6:
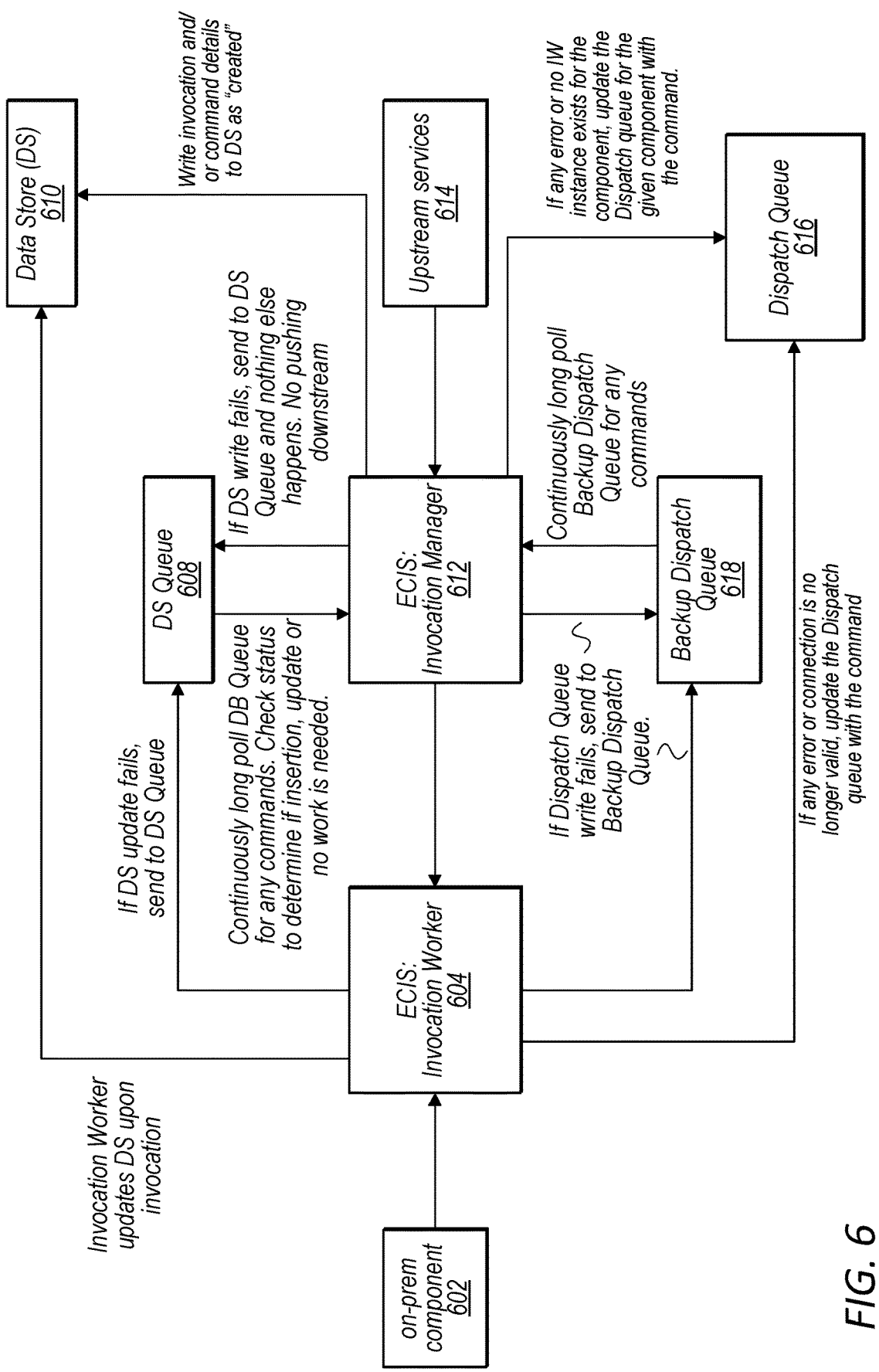
FIG. 6 illustrates a failover diagram for an example embodiment of the large scale responsive and generic endpoint command invocation mechanism that details actions taken when accesses to data stores or databases fails, according to some embodiments.

FIG. 6 illustrates a failover diagram for an example embodiment of the large scale responsive and generic endpoint command invocation mechanism that details actions taken when accesses to data stores or databases fails, according to some embodiments. Upstream services 614 invokes a command to the IM 612. When a command is invoked, IM 612 writes invocation details and/or command details to the data store ("DS") 610 and sets the status to "created." If, however, the write to the DS fails, then the IM 612 sends the invocation details and/or command details to the DS Queue 608, and nothing else happens. There is no pushing of the commands downstream, in these embodiments. The IM 612 will also attempt to determine the appropriate IW that manages a connection to the appropriate on-premises component 602 for the command, as described previously. If there are any errors, or no IW instance exists for the on-premises component to command is targeted to, then update the dispatch queue 616 for the given component with the command. If however, the dispatch queue write fails, then the IM can send the command to the backup dispatch queue 618.

Once the command is dispatched the IW 604, as described previously, then the IW 604 updated the data store upon invocation. If, however, the DS update fails, then the IW 604 can send the update to the DS queue 606. The IW 604 determines a connection to the appropriate on-premises component 602 that is targeted by the command, as described previously. If there is any error, or the connection is no longer valid, then the IW 604 will update the dispatch queue 616 with the command. If, however, the dispatch queue write fails, then the IW 604 can send the command to the backup dispatch queue 618.

The IM 612 continuously long polls the backup dispatch queue 612 for any commands. If commands are found then the IM 612 can attempt to write them to the dispatch queue or attempt to deliver the commands to the appropriate IW 604. If either or both of those actions fail, the IM 612 can keep the command in the backup dispatch queue 618. The IM 612 also continuously long polls the DB Queue 608 for any commands. The IM 612 can check the status of the commands in the DB Queue 608 to determine if insertion, update or no work is needed.

Figure 7:
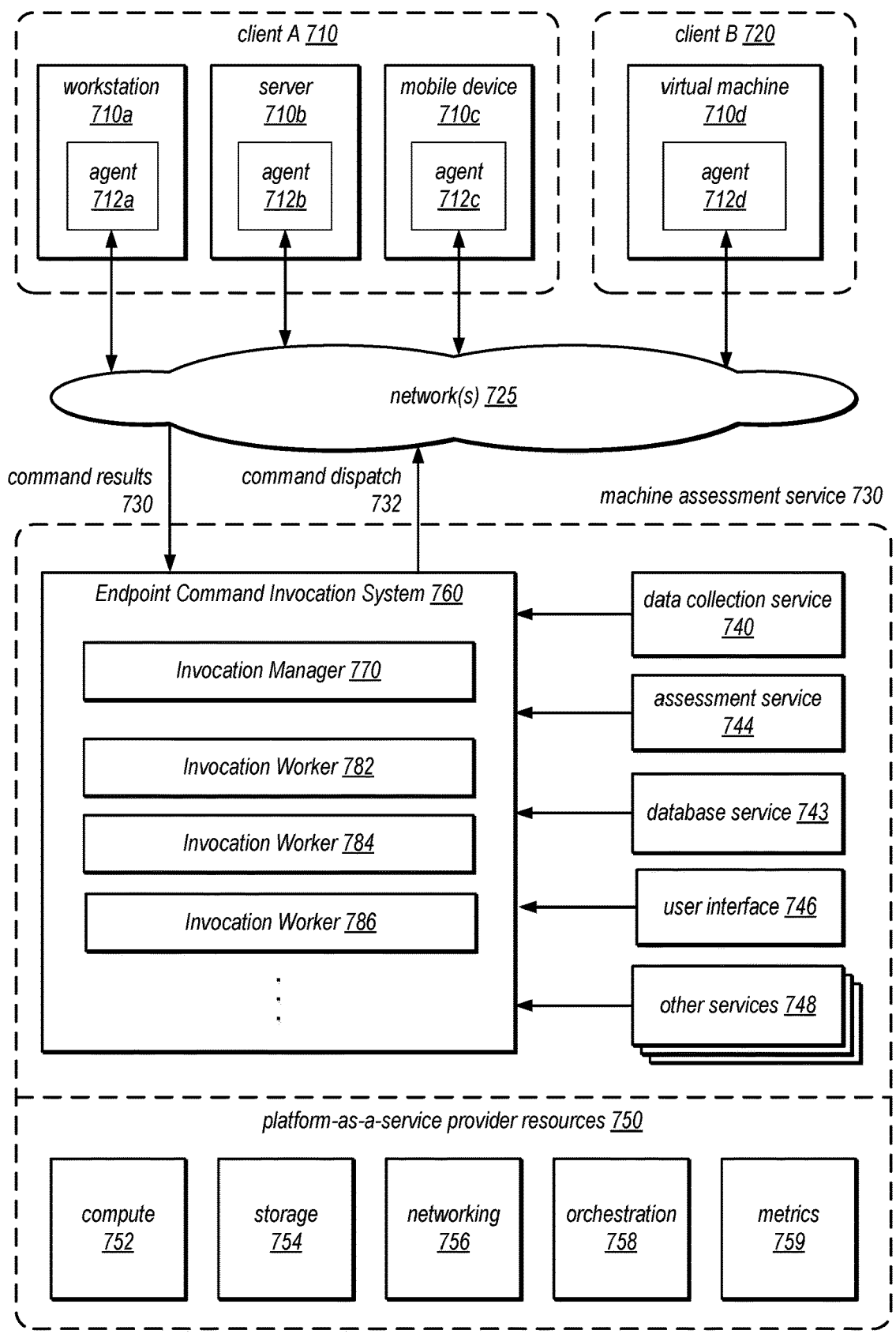
FIG. 7 is a block diagram illustrating an endpoint command invocation system that is implemented as part of a machine assessment service, which is in turn implemented in a platform-as-a-service provider network, according to some embodiments.

FIG. 7 is a block diagram illustrating an endpoint command invocation system 760 that is implemented as part of a machine assessment service 730, which is in turn implemented in a platform-as-a-service provider network that contains platform-as-a-service resources 750, according to some embodiments.

As shown, the machine assessment service 730 may be configured to interact with various agents executing on different clients 710 and 720. The different clients may be different groups, organizations, companies, or other types of entities. In some embodiments, distinct clients 710 and 720 may be associated with a different user account of the machine assessment service 730. As shown, the clients in this example may own different types of computing resources, such as a workstation 710*a*, a server 710*b*, a mobile device 710*c*, and a virtual machine 710*d*. Each these types of machines may be an embodiment of the client machine 110 of FIG. 1. The virtual machine 710*d* may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, client machines 710 may include other types of computing systems, including embedded systems, networking devices, storage devices, Internet-of-Things (IoT) devices, vehicles, and the like.

As shown, each of these types of machines or execution environments may be monitored by agents 712*a-d* that collect machine characteristic data from the machines or execution environments. In some embodiments, the agents 712 may be implemented as a lightweight software module on the client machines 710. Different types of agents 712 may be implemented for different machine platforms, such as WINDOWS, LINUX, or MAC machines. In some embodiments, the agent 712 may be designed to run on a different computing system from the machine 710 being monitored. In that case, the agent 712 may be configured to establish network connections to the machine 710 and collect machine characteristics data over these network connections.

As shown, the agents 712 are configured to communicate with the machine assessment service 730 over one or more networks 725. In various embodiments, the network(s) 725 may encompass any suitable combination of networking hardware and protocols necessary to establish communications between the agent 712 and the machine assessment service 730. In some embodiments, the machine 710 may execute in a private network of a company, behind a company firewall, and the network 725 may include a public network such as the Internet, which lies outside the firewall. The network 725 may encompass the different telecommunications networks and service providers that collectively implement the Internet. In some embodiments, the network 725 may also include private networks such as private local area networks (LANs), private wide area networks (WANs), or private wireless networks. The network 725 may be implemented using different hardware (e.g., modems, routers, switches, load balancers, proxy servers, etc.) and software (e.g., protocol stacks, accounting software, firewall/security software, etc.) for establishing networking links between the client machines 710 and the machine assessment service 730.

As shown, the depicted system is implemented using client machines 710*a-d*, and a machine assessment service 730. In some embodiments, the depicted operations on the client machines 710*a-d* may be performed by the agent 712*a-d* executing on the client machine, which is configured to communicate with the machine assessment service 730 over one or more networks 725, to collect and report machine characteristics data about the client machines to the machine assessment service. In some embodiments, the machine assessment system 730 may be implemented as a cloud-based or network-accessible service, which is configured to receive machine characteristics data from a large number of different client machines and perform security vulnerability assessments on remote machines based on the received data. In some embodiments, each collection agent on the client machines may be assigned a unique agent ID that identifies the agent to the machine assessment service.

As shown, the machine assessment service may include a number of services implemented on of the resources 750 provided by the platform-as-a-service ("PaaS") provider. In this example, resources implement a data collection service 740. The data collection service 740 may be configured to receive machine data from a delta collection process. The data collection service 740 provides instructions and commands to the ECIS 760, which is tasked with sending the instructions or commands to the agent 712*a-d*. The ECIS 760 includes an invocation manager 770 and one or more invocation workers (782, 784, 786) that can operate as described in FIGS. 1-6 and 8-12. The agent instructions may cause the agents 712 to upload patches or full copies of the machine data, adjust their collection scopes, or perform other commands on the client machines.

As shown, the overall machine assessment system 730 also includes an assessment service 744, a database service 743, and other services 748. A data store or connection map may be hosted in the database service 743. In some embodiments, the machine assessment service 730 may provide the database service 743 to store different snapshots being maintained by a collection process. The database service 743 may be implemented on top of storage resources 754 provided by the PaaS provider. For example, the PaaS provider may provide storage in the form of a database, a file system, or a volume hosted in the cloud. In some embodiments, the storage provided by the machine assessment service 730 may be persistent storage. In some embodiments, the provided storage may not be guaranteed to be persistent, so that if the service is restarted, some of data may be lost. In some embodiments, the database service 743 may be enhanced using a high-performance in-memory cache, which may be provided by the PaaS provider as a managed cluster of compute nodes, such as a REDIS cluster.

A machine assessment component may be implemented by an assessment service 244. The assessment process may be conducted by an assessment orchestrator, which may invoke various types of assessments of the client machine. In some embodiments, the assessments may determine various security vulnerabilities of the client machine based on the collected machine characteristics. For example, an assessment may detect conditions such as the existence of malware signatures, missing application patches, incorrect or suspicious file permissions or locations, users with inappropriate access privileges, among other things. In some embodiments, the assessment service may observe and track these conditions over time, to determine a problematic or suspicious pattern of changes on the remote machine. The assessment service 744 may then generate an assessment report that details any detected security vulnerabilities about the machine, which may be provided the machine's owners via a user interface 746.

As shown, the machine assessment service 730 may also implement a user interface 746, which may be a web-based graphical or command line user interface. The user interface 746 can provide a data collection configuration interface, a client machine inspection interface, an assessment reporting interface, and/or an ECIS interface. The client machine inspection interface may be used to examine the current state of the client machine. For example, the client machine inspection interface may allow users to navigate through the client machine's configurations and files, or issue queries against the configuration settings of the client machine. The assessment reporting interface may be used to provide results of machine assessments to users. In some embodiments, the assessment reporting interface may include a notification interface that pushes notifications to registered users, for example, via email or text, or to a client-side repository. The ECIS interface can allow users to directly interact with computing resources 710*a-d* by sending commands to one or more of the resources to be executed.

As shown, the machine assessment service 730 may be implemented within a platform-as-a-service provider network, and the clients of the machine assessment service 730 may convey services requests to and receive responses from PaaS provider network via network 725. In some embodiments, the service request and responses may be web services requests and responses and formatted as JSON documents. The machine assessment service 730 may support REST-style or document-based (e.g., SOAP-based) types of web services requests. In some embodiments, the machine assessment service 730 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 750, which can be leased by service customers to implement custom hosted services. As shown, the PaaS provider may provide resource services such as compute resource service 752, storage resource service 754, networking resources service 756, orchestration service 758, and resource metrics service 759. The services of the machine assessment service 730 may be built using these underlying resource services provided by the PaaS provider. In some embodiments, the PaaS resources 750 may implement features such as load balancing of incoming service requests and/or dynamic management and scaling of service node pools. In some embodiments, each of the services 740, 743, 744, 746, 748, and the ECIS 760 may be implemented using a pool of service nodes provided by the PaaS provider, which may be individual instances of virtual machines. In some embodiments, the PaaS provider may be a provider such as AMAZON WEB SERVICES or MICROSOFT AZURE.

Illustrative Methods Implemented by the Endpoint Command Invocation System

Figure 8:
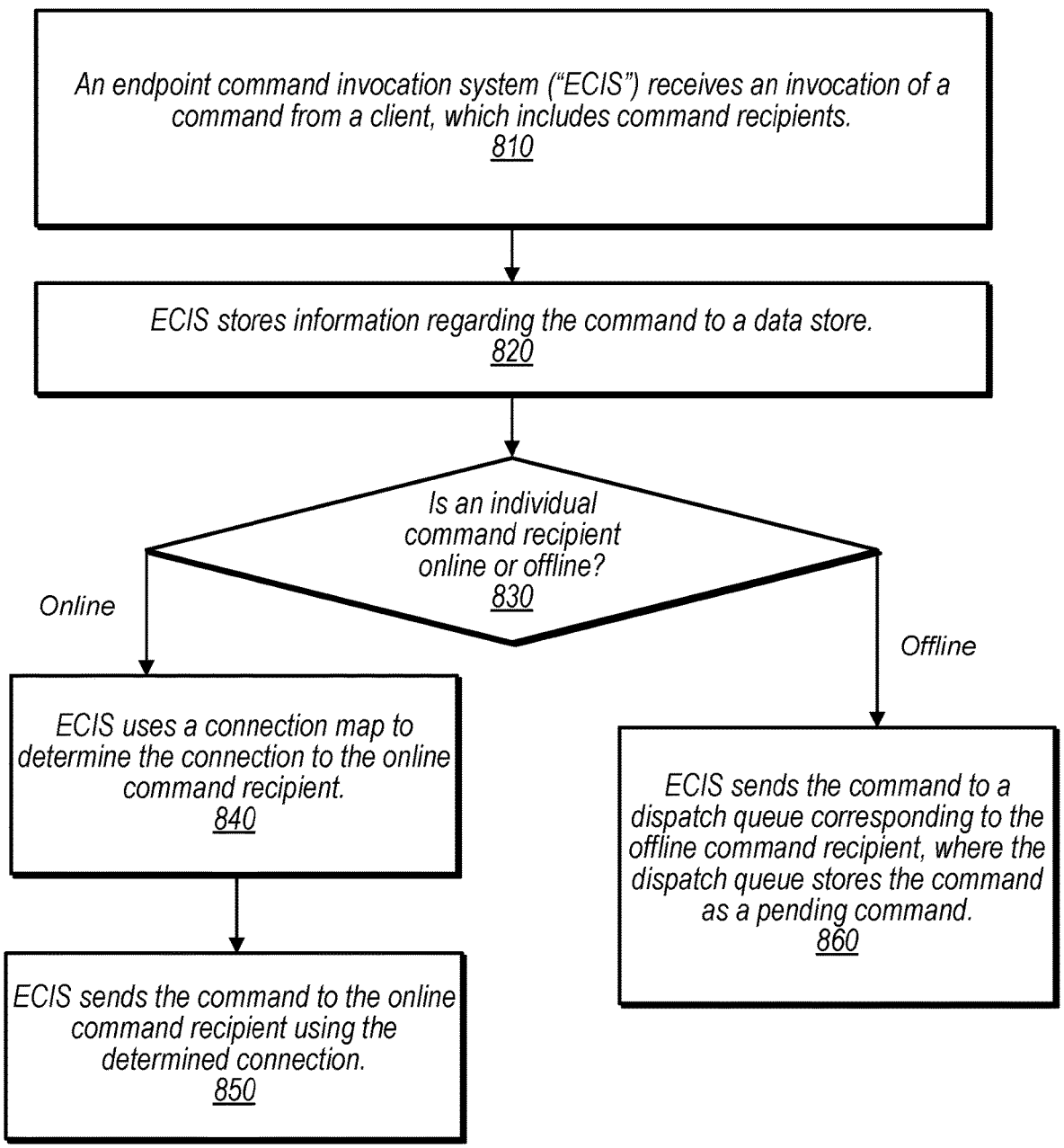
FIG. 8 is a flowchart illustrating a process of the ECIS receiving an invocation of a command and either sending the command to an online command recipient or send the command to a dispatch queue depending on whether the individual command recipient is online or offline, according to some embodiments.

FIG. 8 is a flowchart illustrating a process of the ECIS receiving an invocation of a command and either sending the command to an online command recipient or send the command to a dispatch queue depending on whether the individual command recipient is online or offline, according to some embodiments. The flowchart begins at 810 where an endpoint command invocation system ("ECIS") receives an invocation of a command from a client, which includes command recipients. The flowchart transitions to block 820 in which the ECIS stores information regarding the command to a data store. At block 830, the ECIS determines if an individual command recipient is online or offline. If the individual command recipient is online, the ECIS uses a connection map to determine the connection to the online command recipient at block 840. Then, the ECIS sends the command to the online command recipient using the determined connection at 850. If the individual command recipient is offline, then the ECIS at 860 sends the command to a dispatch queue corresponding to the offline command recipient, where the dispatch queue stores the command as a pending command.

Figure 9:
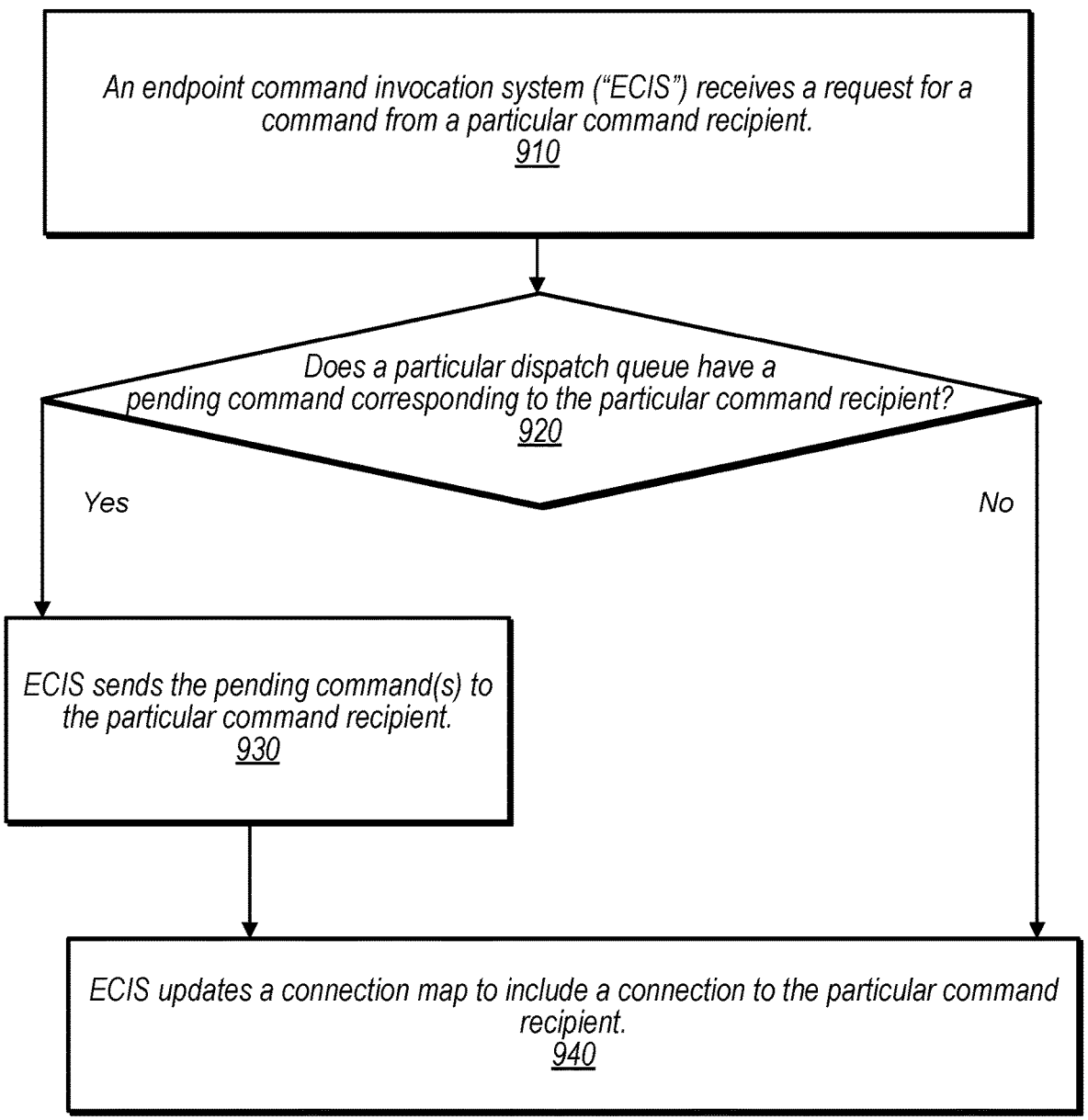
FIG. 9 is a flowchart illustrating a process of the ECIS receiving a request for a command from a command recipient, according to some embodiments.

FIG. 9 is a flowchart illustrating a process of the ECIS receiving a request for a command from a command recipient, according to some embodiments. The flowchart begins at 910 where an endpoint command invocation system ("ECIS") receives a request for a command from a particular command recipient. At block 920, the ECIS determines whether a particular dispatch queue has a pending command corresponding to the particular command recipient. If a particular dispatch queue does have a pending command corresponding to the particular command recipient, then the flowchart transitions to block 930 where the ECIS sends the pending command(s) to the particular command recipient. The flowchart then transitions to 940 where the ECIS updates a connection map to include a connection to the particular command recipient. In some embodiments, however, if the ECIS receives a request for a command from a command recipient and the dispatch queue has outstanding pending commands (a "Yes" outcome from decision block 920), then nothing is added/touched/updated on the connection map (i.e. block 940 is not executed). Anytime a command recipient sends a request to receive a command, and there are pending commands in the dispatch queue for that command recipient, then any connection maps are not used, in these embodiments. If a particular dispatch queue does not have a pending command corresponding to the particular command recipient at 930, then the flowchart transitions right to 940 in which the ECIS updates a connection map to include a connection to the particular command recipient. In some embodiments, step 940 should be executed before step 920. In these embodiments, the connection map should be updated first such that the dispatch queue would only need to be queried once when a command recipient connects. To achieve this, in these embodiments, the connection map must be updated first, otherwise a race exists where new commands could be added to the dispatch queue after the dispatch queue was read but before the connection map was updated.

FIG. 10 is a flowchart illustrating a process of an invocation manager receiving an invocation of a command from a client and dispatching the command to determined invocation worker(s), according to some embodiments. The flowchart begins at 1010, where an invocation manager receives an invocation of a command from a client, which includes command recipients. The flowchart then transitions to 1020 where the invocation manager stores information regarding the command to a data store. Then, the invocation manager uses a global connection map to determine invocation worker(s) that have at least one connection to at least one of the command recipients at block 1030. Finally, the invocation manager dispatches the command to the determined invocation worker(s) at block 1040

Figure 11:
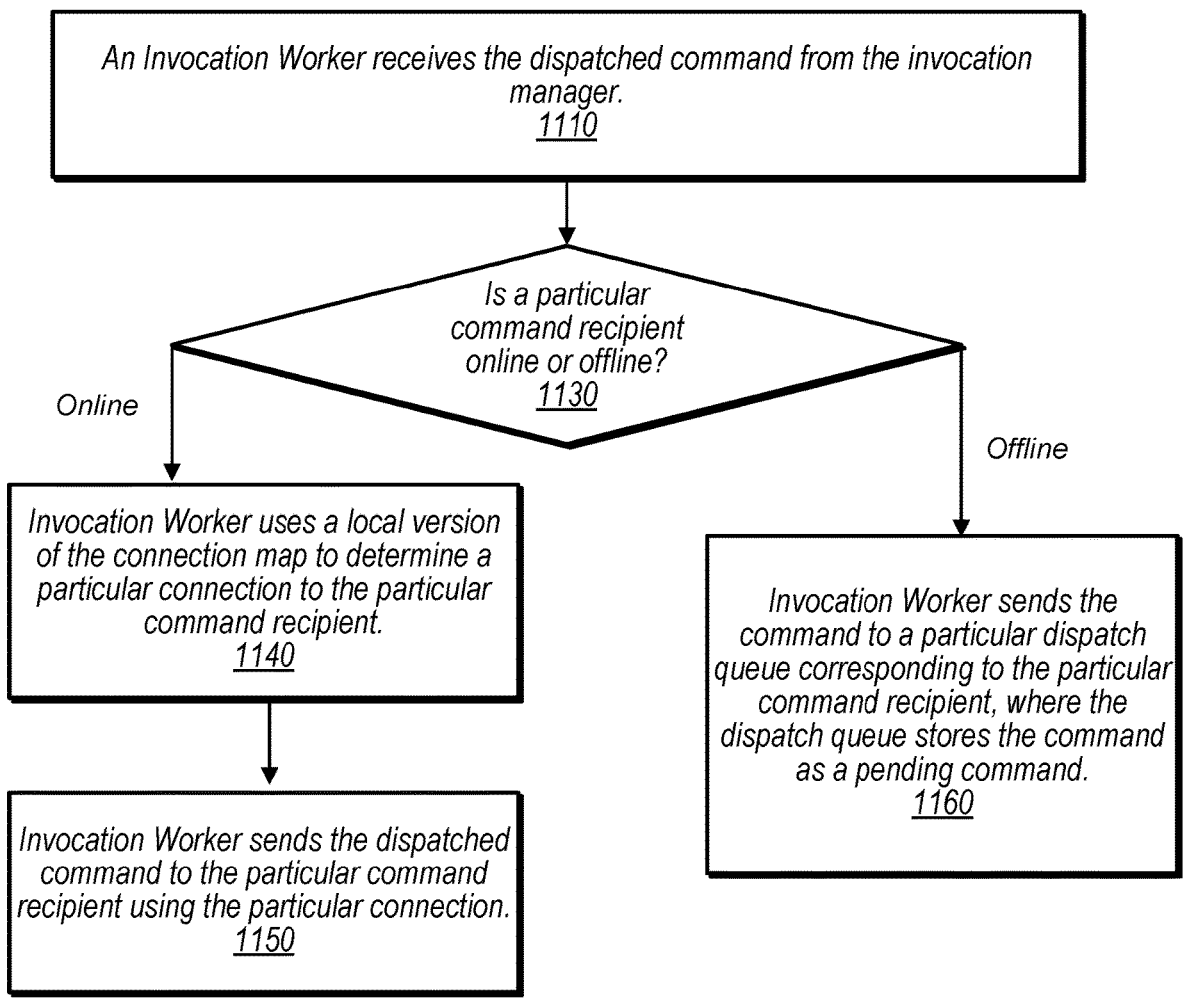
FIG. 11 is a flowchart illustrating a process of an invocation worker receiving the dispatched command from the invocation manager, and either sending the command to an online command recipient or sending the command to a dispatch queue depending on whether the individual command recipient is online or offline.

FIG. 11 is a flowchart illustrating a process of an invocation worker receiving the dispatched command from the invocation manager, and either sending the command to an online command recipient or sending the command to a dispatch queue depending on whether the individual command recipient is online or offline. The flowchart begins at 1110 where an Invocation Worker receives the dispatched command from the invocation manager. The flowchart then determines, at 1130, whether a particular command recipient online or offline. If a particular command recipient is online, then the flowchart transitions to 1140 where the Invocation Worker uses a local version of the connection map to determine a particular connection to the particular command recipient. Then, the Invocation Worker sends the dispatched command to the particular command recipient using the particular connection at 1150. If a particular command recipient is offline, then the flowchart transitions to 1160, where an Invocation Worker sends the command to a particular dispatch queue corresponding to the particular command recipient, where the dispatch queue stores the command as a pending command.

Figure 12:
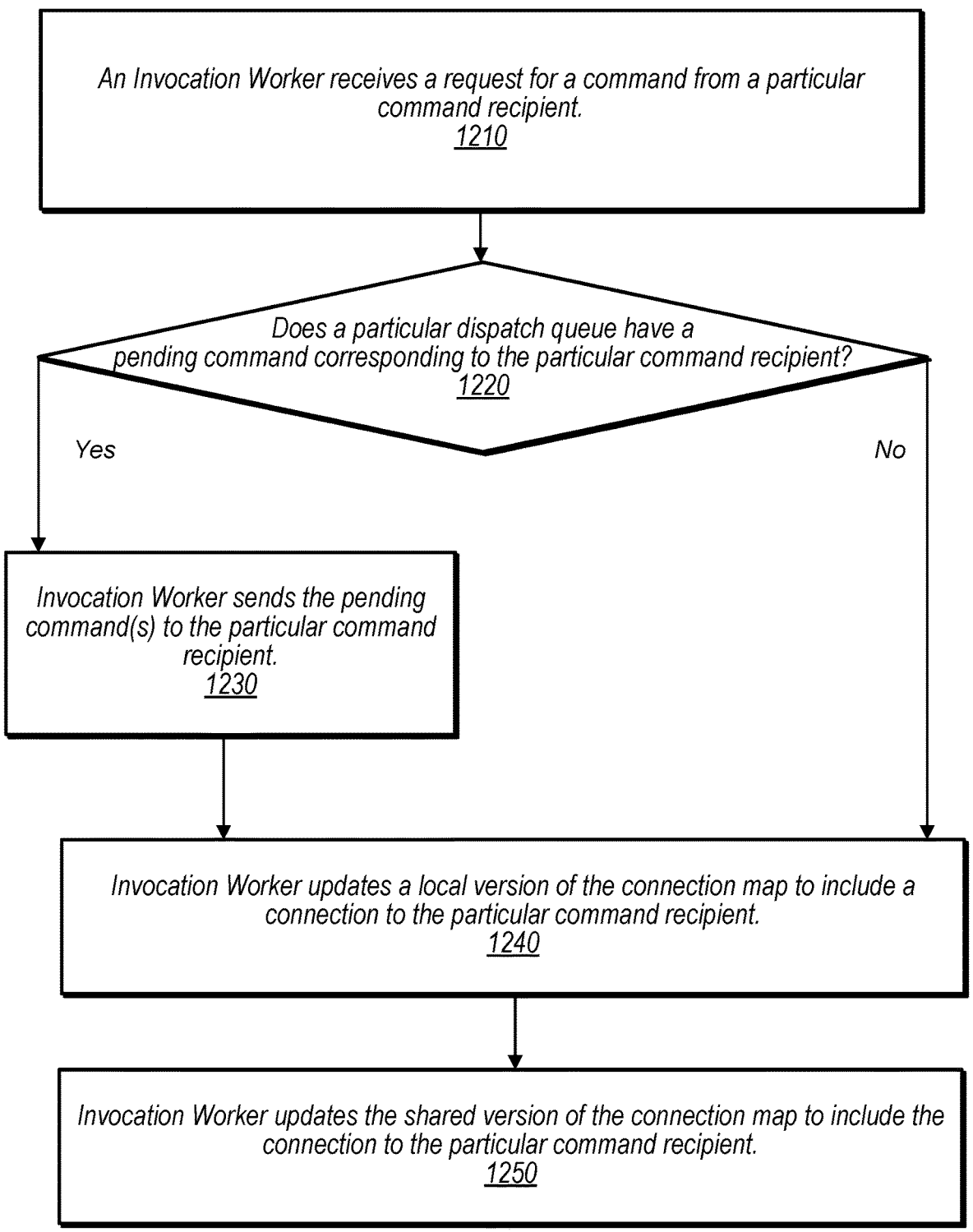
FIG. 12 is a flowchart illustrating a process of an invocation worker receiving a request for a command from a command recipient, according to some embodiments.

FIG. 12 is a flowchart illustrating a process of an invocation worker receiving a request for a command from a command recipient, according to some embodiments. The flowchart begins at 1210 where an Invocation Worker receives a request for a command from a particular command recipient. The flowchart determines at 1220 whether a particular dispatch queue has a pending command corresponding to the particular command recipient. If the particular dispatch queue has a pending command corresponding to the particular command recipient, then the flowchart transitions to 1230 where an Invocation Worker sends the pending command(s) to the particular command recipient. After 1230, the flowchart transitions to 1240, in some embodiments. However, in some other embodiments, if the Invocation Worker receives a request for a command from a command recipient, and the dispatch queue has outstanding pending commands (a "Yes" outcome from decision block 1220), then nothing is added/touched/updated on the connection map (blocks 1240 and 1250 are not executed). Anytime a command recipient sends a request to receive a command, and there are pending commands in the dispatch queue for that command recipient, then any connection maps are not used, in these embodiments. If the particular dispatch queue does not have a pending command corresponding to the particular command recipient, then the flowchart transitions directly to 1240. At block 1240 the Invocation Worker updates a local version of the connection map to include a connection to the particular command recipient. Then, the Invocation Worker updates the shared version of the connection map to include the connection to the particular command recipient at block 1250. In some embodiments, however, steps 1240 and 1250 should be executed before step 1220. In these embodiments, the connection maps should be updated first such that the dispatch queue would only need to be queried once when a command recipient connects. To achieve this, in these embodiments, the connection maps must be updated first, otherwise a race exists where new commands could be added to the dispatch queue after the dispatch queue was read but before the connection maps were updated.

Illustrative System

Figure 13:
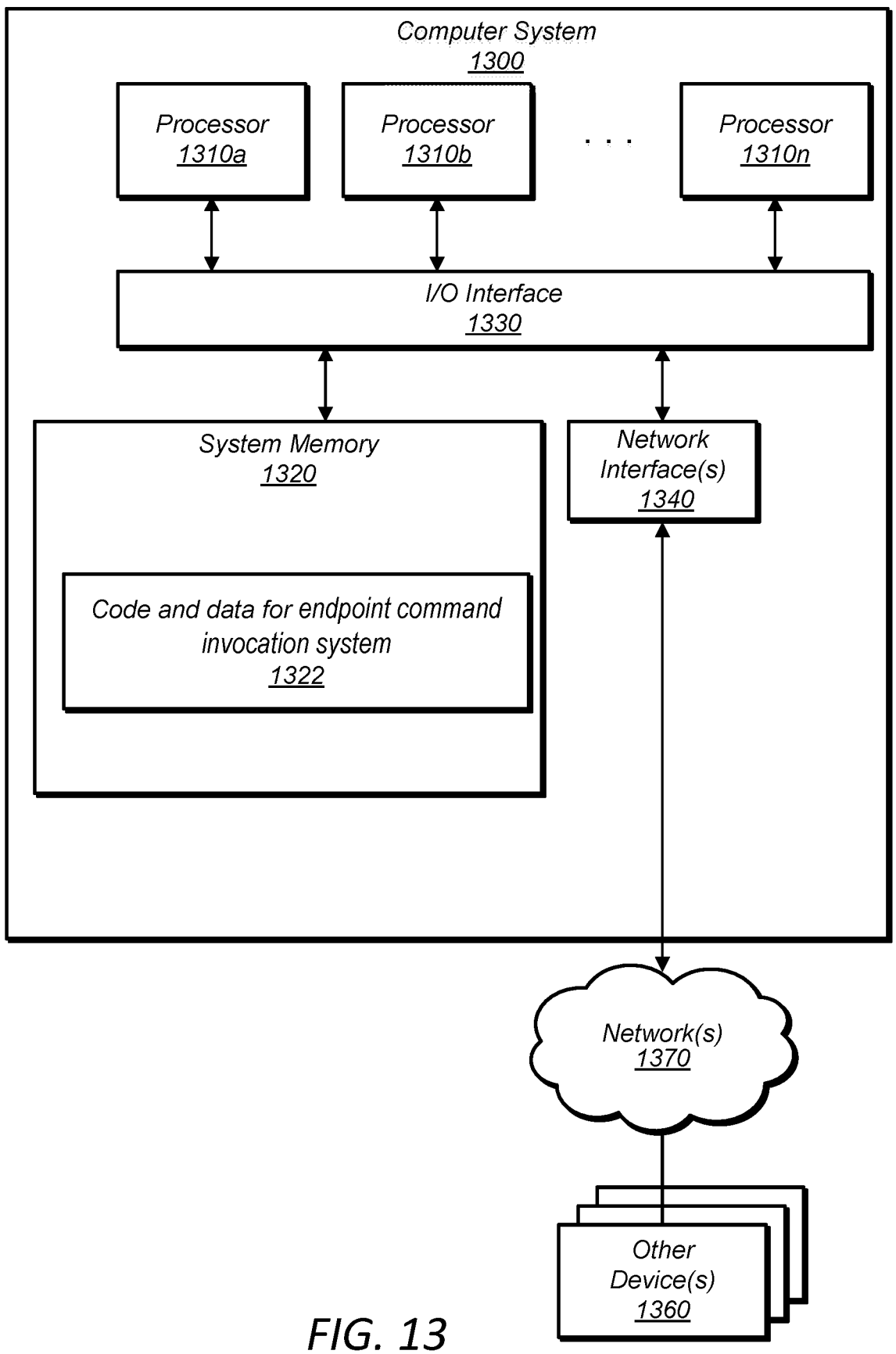
FIG. 13 is a block diagram illustrating an example computer system that can be used to implement a client machine or one or more portions of a endpoint command invocation system, according to some embodiments.

FIG. 13 is a block diagram illustrating an example computer system that can be used to implement a client machine or one or more portions of an endpoint command invocation system and/or a machine assessment system, according to some embodiments.

Computer system 1300 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1300 includes one or more processors 1310, which may include multiple cores coupled to a system memory 1320 via an input/output (I/O) interface 1330. Computer system 1300 further includes a network interface 1340 coupled to I/O interface 1330. In some embodiments, computer system 1300 may be a uniprocessor system including one processor 1310, or a multiprocessor system including several processors 1310a-n, as shown. The processors 1310 may be any suitable processors capable of executing instructions. For example, in various embodiments, processors 1310 may implement one of a number of instruction set architectures (ISAs), such as the x86, PowerPC, SPARC, or MIPS ISA.

As shown, the computer system 1300 may also include one or more network communication devices (e.g., network interface 1340) for communicating with other systems and/or components over a communications network. For example, an instance of an application executing on computer system 1300 may use network interface 1340 to communicate with another server application executing on another computer system, as described herein.

As shown, computer system 1300 may use its network interface 1340 to communicate through one or more network(s) 1370 with one or more other devices 1360, such as persistent storage devices and/or one or more I/O devices. In some embodiments, some of these other devices may be implemented locally on the computer system 1300, accessible via the I/O interface 1330. In various embodiments, persistent storage devices may include disk drives, tape drives, solid state memory, other mass storage devices, or any other persistent storage device. The computer system 1300 may store instructions and/or data in persistent storage devices, and retrieve the stored instruction and/or data as needed.

As shown, the computer system 1300 may include one or more system memories 1320 that store instructions and data accessible by processor(s) 1310. In various embodiments, system memories 1320 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1320 may be used to store code or executable instructions to implement the methods and techniques described herein. For example, the executable instructions may include instructions to implement the endpoint command invocation system 1332, as discussed. The system memory 1320 may also be used to store data needed by the executable instructions. For example, the in-memory data may include portions of the endpoint command invocation system 1332, as discussed.

In some embodiments, some of the code or executable instructions may be persistently stored on the computer system 1300 and may have been loaded from external storage media. The persistent storage of the computer system 1300 and the external media are examples of non-transitory computer-readable storage media, which may be used to store program instructions to be executed by the computer system 1300. A non-transitory computer-readable storage medium may provide the capability to store information in a form readable by a machine (e.g., computer system 1300). Non-transitory computer-readable media may include storage media such as magnetic or optical media, disk or DVD/CD-ROM devices, archival tapes, network-attached storage systems, or other computer systems.

In some embodiments, the I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

In some embodiments, the network interface 1340 may allow data to be exchanged between computer system 1300 and other devices 1360 attached to a network 1370. The network interface 1340 may also allow communication between computer system 1300 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1300. Multiple input/output devices may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1350. Network interface 1340 may commonly support one or more wireless networking protocols (e.g., Wi-Fi/IEEE 802.11, or another wireless networking standard). In some embodiments, the network interface 1340 may support communication via telecommunications/telephony networks such as analog voice networks or digital fiber communications networks, via storage area networks such as Fibre Channel SANs, or via any other suitable type of network and/or protocol.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications may become apparent to those skilled in the art once the disclosed inventive concepts are fully appreciated. Various modifications and changes may be made as would be obvious to a person skilled in the art having the benefit of this disclosure. It is intended that the following claims be interpreted to embrace all such variations and modifications, and the above description to be regarded in an illustrative rather than a restrictive sense.

What is claimed is:

1. A system comprising:
  one or more computer devices that implement an endpoint command invocation system ("ECIS"), configured to:
    receive an invocation of a command from a client, wherein the invocation comprises a plurality of command recipients;
    store information regarding the command to a data store;
    determine that a first command recipient of the plurality of command recipients is online;
    responsive to the determination that the first command recipient is online:
      identify an established connection to the first command recipient according to a description of the established connection stored in a connection map; and
      send the command to the first command recipient using the established connection to the first command recipient identified from the connection map;
    determine that a second command recipient of the plurality of command recipients is offline; and
    responsive to the determination that the second command recipient is offline:
      store the command to a dispatch queue for the second command recipient to be provided to the second command recipient responsive to a request from the second command recipient.

2. The system of claim 1, wherein the ECIS is further configured to:
  receive a request for one or more new commands from the second command recipient;
  determine that the particular dispatch queue for the second command recipient comprises one or more pending commands; and
  send the one or more pending commands to the second command recipient.

3. The system of claim 2, wherein the request for the one or more new commands received from the second command recipient is a long poll request.

4. The system of claim 1, wherein the information regarding the command comprises a status of the command, wherein the status of the command is set to one of multiple status values comprising at least a created status and a dispatched status;

wherein to store the information regarding the command to a data store, the ECIS is further configured to:
set the status of the command to the created status; and
wherein to send the command to the first command recipient, the ECIS is further configured to:
set the status of the command to the dispatched status.

5. The system of claim 1, wherein the ECIS comprises an invocation manager and one or more invocation workers, wherein the invocation manager is configured to perform:
the receiving of the invocation of the command from the client, wherein the invocation comprises the plurality of command recipients;
the storing the information regarding the command to the data store; and
the determining that the first command recipient is online;
wherein the invocation manager is further configured to:
determine, based at least in part on a shared version of the connection map, one or more particular invocation workers of the one or more invocation workers having at least one connection to the first command recipient; and
dispatch the command to the one or more particular invocation workers.

6. The system of claim 5, wherein a particular invocation worker of the one or more particular invocation workers is configured to:
receive the dispatched command from the invocation manager;
wherein to identify the established connection to the first command recipient according to the description of the established connection stored in the connection map, the particular invocation worker is further configured to:
identify the established connection to the first command recipient based at least in part on a local version of the connection map stored at the particular invocation worker; and
wherein to send the command to the first command recipient using the established connection to the first command recipient identified from the connection map, the particular invocation worker is further configured to:
send the dispatched command to the first command recipient using the established connection identified based at least in part on the local version of the connection map.

7. The system of claim 5, wherein a particular invocation worker of the one or more invocation workers is configured to:
receive a request for a command from the second command recipient;
determine that the dispatch queue for the second command recipient comprises one or more pending commands; and
send the one or more pending commands to the second command recipient.

8. A method comprising:
performing by one or more computer devices that implement an endpoint command invocation system ("ECIS"):
receiving an invocation of a command from a client, wherein the invocation comprises a plurality of command recipients;
storing information regarding the command to a data store;
determining that a first command recipient of the plurality of command recipients is online;
responsive to the determination that the first command recipient is online:
identifying an established connection to the first command recipient according to a description of the established connection stored in a connection map; and
sending the command to the first command recipient using the established connection to the first command recipient identified from the connection map;
determining that a second command recipient of the plurality of command recipients is offline; and
responsive to the determination that the second command recipient is offline:
storing the command to a dispatch queue for the second command recipient to be provided to the second command recipient responsive to a request from the second command recipient.

9. The method of claim 8, further comprising:
receiving a request for one or more new commands from the second command recipient;
determining that the particular dispatch queue for the second command recipient comprises one or more pending commands; and
sending the one or more pending commands to the second command recipient.

10. The method of claim 8, wherein the request for the one or more new commands received from the second command recipient is a long poll request.

11. The method of claim 8, wherein the information regarding the command comprises a status of the command, wherein the status of the command is set to one of multiple status values comprising at least a created status and a dispatched status;
wherein storing the information regarding the command to a data store, further comprises:
setting the status of the command to the created status; and
wherein sending the command to the first command recipient, further comprises:
setting the status of the command to the dispatched status.

12. The method of claim 8, wherein the ECIS comprises an invocation manager and one or more invocation workers, wherein the invocation manager performs:
the receiving the invocation of the command from the client, wherein the invocation comprises the plurality of command recipients;
the storing the information regarding the command to the data store; and
the determining that the first command recipient is online; and
wherein the method further comprises, performing by the invocation manager:
determining, based at least in part on a shared version of the connection map, one or more particular invocation workers of the one or more invocation workers having at least one connection to the first command recipient; and
dispatching the command to the one or more particular invocation workers.

13. The method of claim 12, further comprising performing by a particular invocation worker of the one or more particular invocation workers:
receiving the dispatched command from the invocation manager;

wherein the identifying the established connection to the first command recipient according to the description of the established connection stored in the connection map further comprises, performing by the particular invocation worker:
  identifying the established connection to the first command recipient based at least in part on a local version of the connection map stored at the particular invocation worker; and
wherein the sending the command to the first command recipient using the established connection to the first command recipient identified from the connection map further comprises, performing by the particular invocation worker:
  sending the dispatched command to the first command recipient using the established connection identified based at least in part on the local version of the connection map.

14. The method of claim 12, further comprising performing by a particular invocation worker of the one or more particular invocation workers:
  receiving a request for a command from the second command recipient;
  determining that the dispatch queue for the second command recipient comprises one or more pending commands; and
  sending the one or more pending commands to the second command recipient.

15. One or more non-transitory computer-readable storage media storing program instructions that when executed on or across one or more processors of an endpoint command invocation system ("ECIS"), cause the one or more processors to:
  receive an invocation of a command from a client, wherein the invocation comprises a plurality of command recipients;
  store information regarding the command to a data store;
  determine that a first command recipient of the plurality of command recipients is online;
  responsive to the determination that the first command recipient is online:
    identify an established connection to the first command recipient according to a description of the established connection stored in a connection map; and
    send the command to the first command recipient using the established connection to the first command recipient identified from the connection map;
  determine that a second command recipient of the plurality of command recipients is offline; and
  responsive to the determination that the second command recipient is offline:
    store the command to a dispatch queue for the second command recipient to be provided to the second command recipient responsive to a request from the second command recipient.

16. The one or more non-transitory computer-readable storage media of claim 15, wherein the program instructions further cause the one or more processors of the ECIS to:
  receive a request for one or more new commands from the second command recipient;
  determine that the particular dispatch queue for the second command recipient comprises one or more pending commands; and
  send the one or more pending commands to the second command recipient.

17. The one or more non-transitory computer-readable storage media of claim 15, wherein the request for the one or more new commands received from the second command recipient is a long poll request.

18. The one or more non-transitory computer-readable storage media of claim 15, wherein the ECIS comprises an invocation manager and one or more invocation workers, wherein the program instructions cause one or more same or different processors of the invocation manager to perform:
  the receiving of the invocation of the command from the client, wherein the invocation comprises the plurality of command recipients;
  the storing of the information regarding the command to the data store; and
  the determining that the first command recipient is online;
  wherein the program instructions further cause the one or more same or different processors of the invocation manager to:
    determine, based at least in part on a shared version of the connection map, one or more particular invocation workers of the one or more invocation workers having at least one connection to the first command recipient; and
    dispatch the command to the one or more particular invocation workers.

19. The one or more non-transitory computer-readable storage media of claim 18, wherein the program instructions further cause one or more same or different processors of a particular invocation worker of the one or more particular invocation workers to:
  receive the dispatched command from the invocation manager;
  wherein to identify the established connection to the first command recipient according to the description of the established connection stored in the connection map, the program instructions further cause the one or more same or different processors of a particular invocation worker to:
    identify the established connection to the first command recipient based at least in part on a local version of the connection map stored at the particular invocation worker; and
  wherein to send the command to the first command recipient using the established connection to the first command recipient identified from the connection map, the program instructions further cause the one or more same or different processors of a particular invocation worker to:
    send the dispatched command to the first command recipient using the established connection identified based at least in part on the local version of the connection map.

20. The one or more non-transitory computer-readable storage media of claim 18, wherein the program instructions further cause one or more same or different processors of a particular invocation worker of the one or more particular invocation workers to:
  receive a request for a command from the second command recipient;
  determine that the dispatch queue for the second command recipient comprises one or more pending commands; and
  send the one or more pending commands to the second command recipient.

* * * * *